United States Patent
Duvvuri et al.

(10) Patent No.: US 11,430,006 B2
(45) Date of Patent: Aug. 30, 2022

(54) DETERMINING A TARGET GROUP BASED ON PRODUCT-SPECIFIC AFFINITY ATTRIBUTES AND CORRESPONDING WEIGHTS

(71) Applicant: Oracle International Corporation, Redwood Shores, CA (US)

(72) Inventors: Venkata Chandrashekar Duvvuri, San Jose, CA (US); Jeffrey Alan Stern, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/666,070

(22) Filed: Oct. 28, 2019

(65) Prior Publication Data

US 2021/0125221 A1    Apr. 29, 2021

(51) Int. Cl.
*G06Q 30/02* (2012.01)
*G06N 5/04* (2006.01)
*G06N 20/00* (2019.01)

(52) U.S. Cl.
CPC ........... *G06Q 30/0254* (2013.01); *G06N 5/04* (2013.01); *G06N 20/00* (2019.01)

(58) Field of Classification Search
USPC ...................................................... 705/14.52
See application file for complete search history.

(56) References Cited

U.S. PATENT DOCUMENTS

| | | | | |
|---|---|---|---|---|
| 7,720,720 B1 * | 5/2010 | Sharma | ................... | G06Q 30/02 705/26.7 |
| 10,650,432 B1 * | 5/2020 | Joseph | ............... | G06Q 30/0631 |
| 10,824,940 B1 * | 11/2020 | Rybakov | ................... | G06N 3/08 |
| 10,956,833 B1 * | 3/2021 | Yamane | ............... | G06F 11/3612 |
| 2007/0094067 A1 * | 4/2007 | Kumar | ............... | G06Q 30/0201 705/26.2 |
| 2010/0153187 A1 * | 6/2010 | Ghani | ................ | G06Q 30/0204 705/14.53 |
| 2011/0246574 A1 * | 10/2011 | Lento | .................... | G06F 16/958 709/204 |
| 2012/0226559 A1 * | 9/2012 | Baum | .................... | G06Q 30/02 705/14.66 |

(Continued)

OTHER PUBLICATIONS

"Leveraging Cloud-Based Predictive Analytics to Strengthen Audience Engagement" by U. Shakeel and M. Limcaco (Year: 2016).*

*Primary Examiner* — Victoria E. Frunzi

(74) *Attorney, Agent, or Firm* — Invoke

(57) ABSTRACT

A campaign profile specifies products and/or content items associated with a campaign. A target group selection engine applies an affinity attribute model to user information of a user. The affinity attribute model is used to determine the user's affinity towards (a) product attributes of the products associated with the campaign and/or (b) content attributes of the content items associated with the campaign. The affinity attribute model may be generated using machine learning. A user interface accepts target user tuning parameters that specify weights to be applied to the affinity attributes determined by the affinity attribute model. Based at least on applying the weights to the affinity attributes, an inclusion score and/or exclusion score for the user is determined. The user is included in a target group, for engaging with the campaign, based on the inclusion score and/or exclusion score.

20 Claims, 13 Drawing Sheets

(56) References Cited

U.S. PATENT DOCUMENTS

| | | | |
|---|---|---|---|
| 2013/0346404 A1* | 12/2013 | Bennett | G06F 16/9535 |
| | | | 707/732 |
| 2014/0222506 A1* | 8/2014 | Frazer | G06Q 30/02 |
| | | | 705/7.29 |
| 2014/0372197 A1* | 12/2014 | Muhammad | G06Q 30/0233 |
| | | | 705/14.33 |
| 2014/0372412 A1* | 12/2014 | Humphrey | G06F 16/90335 |
| | | | 707/722 |
| 2016/0132926 A1* | 5/2016 | Zimmerman, Jr. | |
| | | | G06Q 30/0255 |
| | | | 705/14.53 |
| 2016/0283481 A1* | 9/2016 | Morley | G06F 16/9535 |
| 2017/0262894 A1* | 9/2017 | Kirti | G06Q 30/0269 |
| 2019/0073685 A1* | 3/2019 | Ayzenshtat | G06Q 30/0204 |

\* cited by examiner

System 100

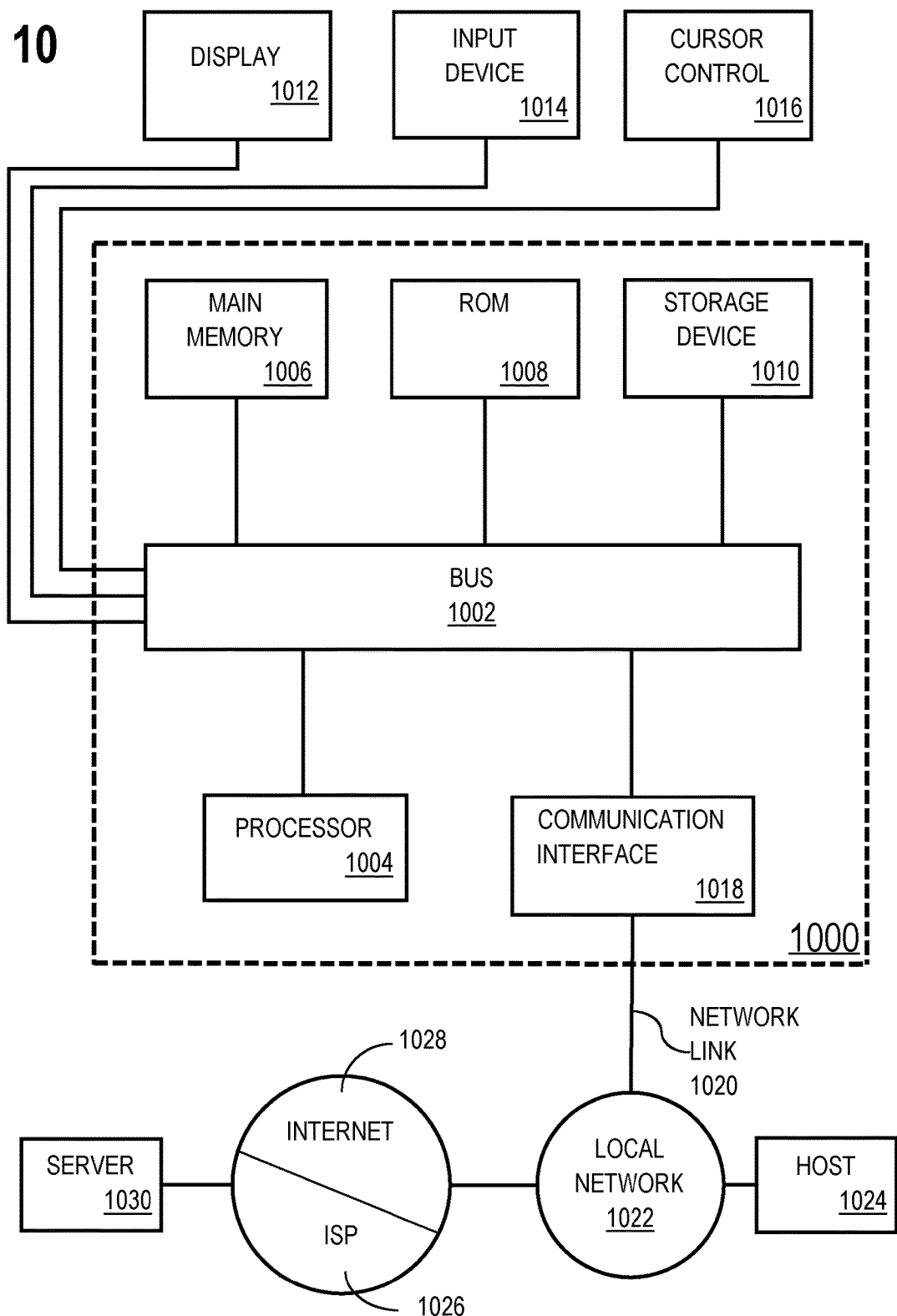

DETERMINING A TARGET GROUP BASED ON PRODUCT-SPECIFIC AFFINITY ATTRIBUTES AND CORRESPONDING WEIGHTS

TECHNICAL FIELD

The present disclosure relates to determining a target group of users. In particular, the present disclosure relates to determining a target group of users based on product-specific affinity attributes and corresponding weights.

BACKGROUND

Campaign management applications allow for campaign content creation, campaign content dissemination, and/or campaign content response tracking. Campaign management applications allow for specification of a target audience for campaign content based on a segmentation approach. According to the segmentation approach, users are segmented based on certain user attributes, such as age, gender, geographical location, interaction history. A campaign administrator selects certain segments of users to be included in the target audience. As an example, a campaign administrator may select users who are between 18-25 and female to be included. All other users would be excluded.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

Figure 1:
FIG. 1 illustrates a target group selection system, in accordance with one or more embodiments.
Figure 1:
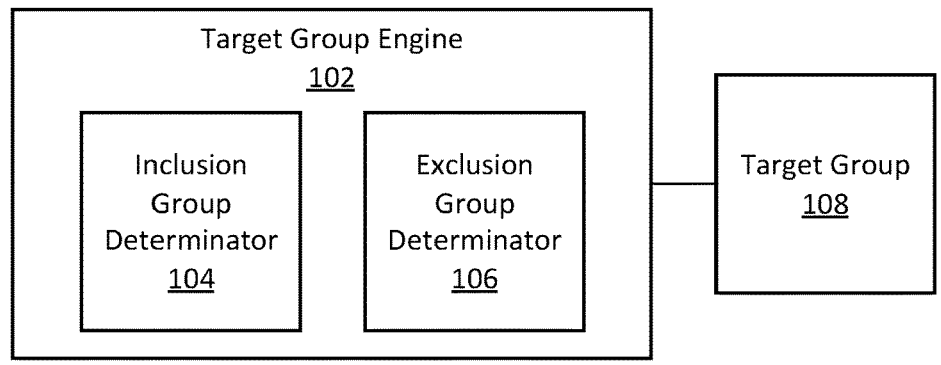

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TARGET GROUP SELECTION SYSTEM ARCHITECTURE
3. MACHINE LEARNING SYSTEMS
4. DETERMINING A TARGET GROUP OF USERS FOR ENGAGING WITH A CAMPAIGN
5. USING MACHINE LEARNING TO GENERATE MODELS FOR GENERATING AND/OR ENHANCING USER PROFILES
6. EXAMPLE EMBODIMENTS
7. HARDWARE OVERVIEW
8. MISCELLANEOUS; EXTENSIONS

1. General Overview

One or more embodiments include determining a target group for engaging with a campaign based on product-specific affinity attributes. An affinity attribute model is configured to determine an affinity of a user towards a product attribute. The term "affinity" may refer to positive affinity or negative affinity. A positive affinity represents a level that a user favors or is attracted towards a product attribute. A negative affinity represents a level that a user disfavors a product attribute. An affinity attribute model may be generated using machine learning based on a training set of user information. Affinity attributes are "product-specific" if the affinity attributes are determined specifically with respect to product attributes of one or more products of interest. The products of interest may be, for example, products that are being promoted and/or discounted in a particular sales campaign. A campaign management application may utilize an affinity attribute model to determine a target group of users based on product-specific affinity attributes. The campaign management application may direct campaign content about the products of interest and/or sales campaign towards the target group of users, without sending the campaign content to other users. Campaign content may be more effective for the target group of users who have positive affinities towards product attributes of the products of interest, than for other users. For example, the target group of users may have a greater likelihood of interacting with the campaign content, or even making a purchase in response to the campaign content, than the other users. Hence, the campaign management application is able to take a product-specific approach that considers user affinities when determining a target group.

One or more embodiments include determining a target group for engaging with a campaign based on utilizing different weights for affinity attributes, confirmable user attributes, and/or inferred user attributes. Users are associated with various user attributes, such as age, gender, geographical location, employment status, and the affinity attributes described above. Different user attributes have different levels of significance and/or correlations towards the effectiveness of campaign content for a particular user. As an example, users who are parents may be more likely to engage with a back-to-school campaign, whereas users who are retirees may be more likely to engage with a summer vacations promotion. Meanwhile, users who are not parents do not necessarily have no interest in the back-to-school campaign. Users who, for example, live nearby the store and have positive affinity towards craft supplies may still be likely to engage with the back-to-school campaign. A user interface of a campaign management application is configured to accept tuning parameters specifying weights applicable to various user attributes. The campaign management application generates an inclusion score function using the specified weights. The campaign management application inputs affinity attributes, confirmable user attributes, and/or inferred user attributes of a user into the inclusion score function, applies the specified weights to the user attributes, and thereby determines an inclusion score. The campaign management application determines whether the user is included in the target group based on the inclusion score. Hence, the campaign management application is able to take an individualized approach that considers a broad spectrum of user attributes when determining a target group.

One or more embodiments described in this Specification and/or recited in the claims may not be included in this General Overview section.

2. Target Group Selection System Architecture

FIG. 1 illustrates a target group selection system, in accordance with one or more embodiments. As illustrated in FIG. 1, a system 100 includes a target group engine 102, which includes an inclusion group determinator 104 and an exclusion group determinator 106, and a target group 108. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a target group 108 includes a group of users who are selected for engaging with a campaign. Engaging with a campaign includes receiving one or more campaign content items associated with the campaign. Campaign content includes content that promotes, markets, and/or otherwise describes, products and/or services associated with a campaign. Campaign content may be disseminated in any form, such as emails, video content, audio content, and/or physical mail.

A target group 108 may selected based on an inference and/or other determination that the campaign content items will be more effective for the target group 108, than for other users who are not within the target group 108. For example, the target group of users may have a greater likelihood of engaging or interacting with the campaign content, or even making a purchase in response to the campaign content, than the other users.

In one or more embodiments, a target group engine 102 refers to hardware and/or software configured to perform operations described herein for determining a target group 108 of users for engaging with a campaign. Examples of operations for determining a target group 108 of users for engaging with a campaign are described below with reference to FIGS. 5-6B.

In an embodiment, a target group engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In one or more embodiments, a target group engine 102 includes an inclusion group determinator 104 and an exclusion group determinator 106. An inclusion group determinator 104 refers to hardware and/or software configured to determine an inclusion group of users. An exclusion group determinator 106 refers to hardware and/or software configured to determine an exclusion group of users. A target group 108 of users includes the inclusion group of users, while excluding the exclusion group of users. Hence, a user who is in the inclusion group but not in the exclusion group is a member of the target group 108. A user who is in the inclusion group and in the exclusion group is not a member of the target group 108. A user who is not in the inclusion group is not a member of the target group 108 (regardless of whether the user is in the exclusion group). Further details regarding an inclusion group determinator 104 and an exclusion group determinator 106 are described below with reference to FIG. 2.

Figure 2:
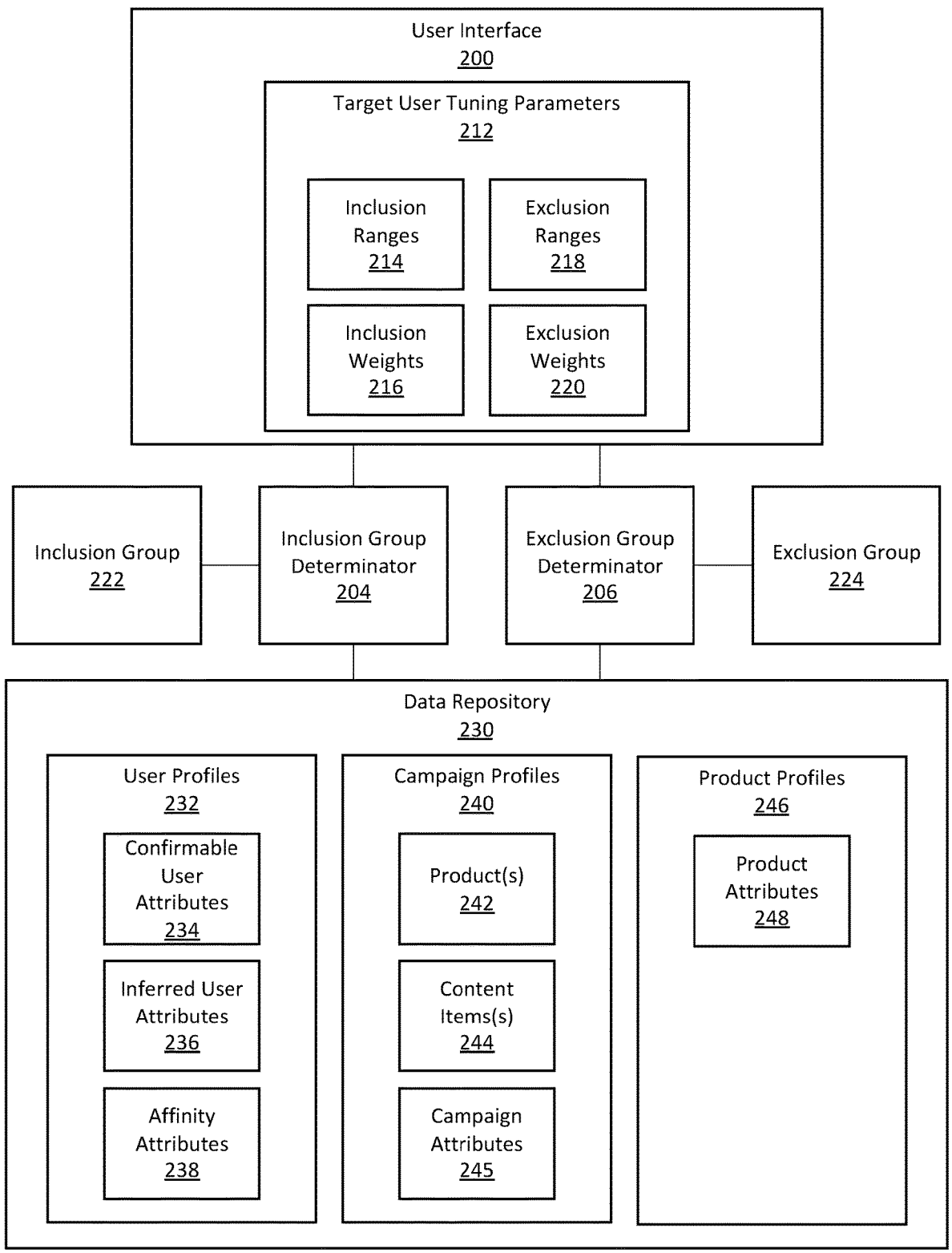
FIG. 2 illustrates additional details of a target group selection system, in accordance with one or more embodiments.

FIG. 2 illustrates additional details of a target group selection system, in accordance with one or more embodiments. As illustrated in FIG. 2, a system includes a user interface 200, an inclusion group determinator 204, an inclusion group 222, an exclusion group determinator 206, an exclusion group 224, and a data repository 230. In one or more embodiments, the system may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, as described above, an inclusion group determinator 204 refers to hardware and/or software configured to determine an inclusion group 222 of users. Examples of operations for determining an inclusion group 222 are described below with reference to FIG. 6A.

An inclusion group determinator 204 includes an inclusion score function for determining an inclusion score for each user. In an embodiment, an inclusion score function includes a set of inclusion ranges 214 respectively applied to a set of user attributes (confirmable user attributes 234, inferred user attributes 236, and/or affinity attributes 238) of a user. The inclusion score function determines whether one or more user attributes are within corresponding inclusion ranges 214. If yes, then the user is included in an inclusion group 222. The inclusion score function may output an inclusion score for the user that is above a threshold value for including the user in the inclusion group 222. Otherwise, the user is excluded from the inclusion group 222. The inclusion score function may output an inclusion score for the user that is below a threshold value for including the user in the inclusion group 222.

In an embodiment, an inclusion score function includes a set of inclusion weights 214 respectively applied to a set of user attributes (confirmable user attributes 234, inferred user attributes 236, and/or affinity attributes 238) of a user. The inclusion score function computes a weighted sum of the user attributes. An example inclusion score function is as follows:

Inclusion Score=$w_1 a_1 + w_2 a_2 + w_3 a_3 + \ldots$ wherein $w_x$ represent the inclusion weights 214, and $a_x$ represent the user attributes. The inclusion score function determines whether the weighted sum is above a threshold value. If yes, then the user is included in an inclusion group 222. Otherwise, the user is excluded from the inclusion group 222.

In one or more embodiments, as described above, an exclusion group determinator 206 refers to hardware and/or software configured to determine an exclusion group 224 of users. Examples of operations for determining an exclusion group 224 are described below with reference to FIG. 6B.

An exclusion group determinator 206 includes an exclusion score function for determining an exclusion score for each user. An exclusion score function is similar to an inclusion score function, as described above. In an embodiment, an exclusion score function includes a set of exclusion ranges 218 respectively applied to a set of user attributes (confirmable user attributes 234, inferred user attributes 236, and/or affinity attributes 238) of a user. In an embodiment, an exclusion score function includes a set of exclusion weights 220 respectively applied to a set of user attributes (confirmable user attributes 234, inferred user attributes 236, and/or affinity attributes 238) of a user.

In an embodiment, an inclusion group determinator 204 and/or exclusion group determinator 206 are implemented on one or more digital devices.

In one or more embodiments, a data repository 230 is any type of storage unit and/or device (e.g., a file system, database, collection of tables, or any other storage mechanism) for storing data. Further, a data repository 230 may include multiple different storage units and/or devices. The multiple different storage units and/or devices may or may not be of the same type or located at the same physical site. Further, a data repository 230 may be implemented or executed on the same computing system as an inclusion group determinator 204, exclusion group determinator 206, and/or target group engine. Alternatively or additionally, a data repository 230 may be implemented or executed on a computing system separate from an inclusion group determinator 204, exclusion group determinator 206, and/or target group engine. The data repository 104 may be communicatively coupled to the inclusion group determinator 204, exclusion group determinator 206, and/or target group engine via a direct connection or via a network.

Information describing user profiles 232, campaign profiles 240, and product profiles 246 may be implemented across any of components within the system. However, this information is illustrated within the data repository 230 for purposes of clarity and explanation.

In one or more embodiments, a user profile 232 includes a set of user attributes derived from user information that may be collected from one or more data sources. Data sources may include cookies associated with a user, web applications with personal information entered and/or shared by a user, and public data sources with public information associated with a user.

A user profile 232 may include confirmable user attributes 234. Confirmable user attributes 234 are attributes that are directly confirmable based on user information collected from one or more data sources. As an example, a user may publicly post a resume on a social media platform. The resume may provide the user's work history and educational history. Hence, confirmable user attributes for the user may include the companies the user has worked at, the titles he has held, the degrees he has obtained, the schools he has attended. Additionally, a government database of registered businesses may include addresses of the companies the user has worked at. Hence, confirmable user attributes for the user may also include geographical locations associated with the user.

A user profile 236 may include inferred user attributes 236. Inferred user attributes 236 are attributes that are inferred from user information collected from one or more data sources. As an example, cookies of a user may indicate that the user has a recent web history of searching for maternity clothing. Based on the interaction history, an inferred user attribute may include that the user is an expectant mother. As another example, a ticketing application may indicate that the user has purchased ten opera show tickets in the past twelve months. Based on the purchase history, an inferred user attribute may include that the user is an opera lover. In an embodiment, inferred user attributes 236 may be determined by an inferred user attribute model generated using machine learning, which is further described below with reference to FIG. 3.

An inferred user attribute 236 may be represented as a score indicating a level of confidence of the inference. Additionally or alternatively, an inferred user attribute 236 may be represented as a score indicating a level at which a user exhibits the inferred user attribute 236. As an example, Jane and Mary may both conduct online research on an academic platform about solar power. Jane may view more academic articles than Mary. An inferred user attribute indicating that Jane is a Doctor of Philosophy (PhD) candidate in solar power may be associated with a higher score than an inferred user attribute indicating that Mary is a PhD candidate in solar power.

A user profile 236 may include affinity attributes 238. An affinity attribute 238 are attributes indicating how much a user favors or disfavors a certain attribute of a product and/or a campaign. Affinity attributes 238 may be inferred from user information collected from one or more data sources. As an example, a shopping history of a user may indicate that 75% of the clothing purchased has a dominant color of black. Based on the shopping history, an affinity attribute may include that the user has a positive affinity towards black clothing. As another example, a shopping history of a user may indicate that 2% of the clothing purchased has a dominant color of red. Based on the shopping history, an affinity attribute may include that the user has a negative affinity towards red clothing. As another example, a shopping history of a user may indicate that 70% of a user's clothing purchase are on clearance. Based on the shopping history, an affinity attribute may include that the user has a positive affinity towards clearance campaigns and clearance messaging. In an embodiment, affinity attributes 238 may be determined by an affinity attribute model generated using machine learning, which is further described below with reference to FIG. 4.

An affinity attribute 238 may be expressed as a score indicating a level of confidence of the determination of the affinity attribute 238. Additionally or alternatively, an affinity attribute 238 may be expressed as a score indicating a level at which a user favors or disfavors a certain attribute. As an example, Jane and Mary may both shop for clothing online. 80% of clothing viewed by Jane may include polka dot patterns. 70% of clothing viewed by Mary may include polka dot patterns. Hence, Jane's positive affinity towards polka dot patterns may be determined to be higher than that of Mary's.

In one or more embodiments, a campaign profile 240 includes information defining a sales campaign. A campaign administrator may specify the information via a user interface. Additionally or alternatively, another application may supply the information via an application programming interface (API). As an example, an inventory application may supply information regarding overstocked products. Based on the inventory application, a campaign profile may specify the overstocked products as products to be promoted in a campaign.

A campaign profile 240 specifies a set of one or more products and/or services 242 that are being promoted, discounted, and/or otherwise highlighted by a campaign. As an example, products of a back-to-school campaign may include backpacks, stationary, and school clothing. As another example, products of an end-of-summer campaign may include short-sleeve shirts, shorts, and swimsuits.

A product and/or service 242 is associated with a set of product attributes 248. Examples of product attributes 248 include a color, pattern, product type, dimensions of the product, specifications of the product, and product ratings.

A product profile 246 stores product attributes 248 of a particular product 242. A product profile 246 may be generated based on user input and/or by another application. An application may analyze a product 242 to determine associated product attributes 248. As an example, a software product may be tested to determine a throughput of the software product. The throughput may be stored as a product attribute. As another example, a photo of a product may be analyzed to determine a color of the product. The color may be stored as a product attribute. As another example, a label of a product may be analyzed using optical character recognition (OCR). A number of calories per serving of the product, as indicated on the label, may be stored as a product attribute.

A campaign profile 240 specifies a set of one or more content items 244. A content item 244 is an object and/or message to be transmitted to one or more users to promote or otherwise bring attention to a campaign and/or associated products 242. A content item 244 included in a campaign profile 240 may be a draft of an object to be transmitted to users or a final version of an object to be transmitted to users. A content item 244 may be disseminated in any form, such as emails, video content, audio content, and/or physical mail. Content items 244 directed towards a target group 108 may be referred to as "campaign content."

A content item 244 is associated with a set of content attributes. Content attributes may be determined based on user input and/or by another application. An application may analyze a content item 244 to determine associated content attributes. As an example, an e 111 application may execute natural language processing on a content item to determine a theme of the content item. The theme may be stored as a content attribute.

A campaign profile 240 specifies a set of one or more campaign attributes 245. Examples of campaign attributes 245 include a campaign type, campaign duration, and promotion type. A campaign type may be seasonal or otherwise related to a time of year. Additionally or alternatively, a campaign type may be related to an inventory status. Examples of campaign types include "Back to School Promotion," "Thanksgiving Sale," "Winter Promotion," "Clearance," "New Arrivals." Examples of promotion types include "Discounts on All Items," "Discounts on Marked-Down Items," "Buy One Get One Free," "Buy One Get One 50% Off."

In one or more embodiments, as described above, a product and/or service 242 is associated with a set of product attributes 248. Product attributes 248 are organized in a product attribute hierarchy. The product attribute hierarchy is stored separately from product profiles 236 in a data repository 230. In the product attribute hierarchy, a parent node may be associated with a particular product attribute, while a child node may be associated with a sub-type of the particular product attribute. As an example, a product attribute hierarchy may include a top node associated with a product type, "clothing." Two child nodes of the "clothing" node may be respectively associated with the product types, "tops" and "bottoms." Two child nodes of the "bottoms" node may be respectively associated with the styles, "solid colors" and "patterned." Two child nodes of the "patterned" node may be respectively associated with the patterns, "striped pattern" and "polka dot pattern."

A particular product that is associated with a particular product attribute represented by a child node is considered to be also associated with all product attributes represented by any ancestor nodes of the child node. Referring to the example product attribute hierarchy above, a product that is associated with "patterned" is also considered to be associated with "bottoms" (parent of "patterned") and "clothing" (grandparent of "patterned"). However, the product is not necessarily associated with "striped pattern" or "polka dot pattern" (children of "patterned").

In one or more embodiments, a user interface 200 refers to hardware and/or software configured to facilitate communications between a user and an inclusion group determinator 204, exclusion group determinator 206, and/or target group engine. A user interface 200 renders user interface elements to present information to a user and/or to receive user input from a user. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, a user interface 200 accepts user input specifying target user tuning parameters 212. Target user tuning parameters 212 are parameters used to tune an inclusion score function for determining an inclusion group 222 and/or an exclusion score function for determining an exclusion group 224. As described above, an inclusion score function includes one or more inclusion ranges 214 and/or inclusion weights 216. An exclusion score function includes one or more exclusion ranges 218 and/or exclusion weights 220.

3. Machine Learning Systems

Figure 3:
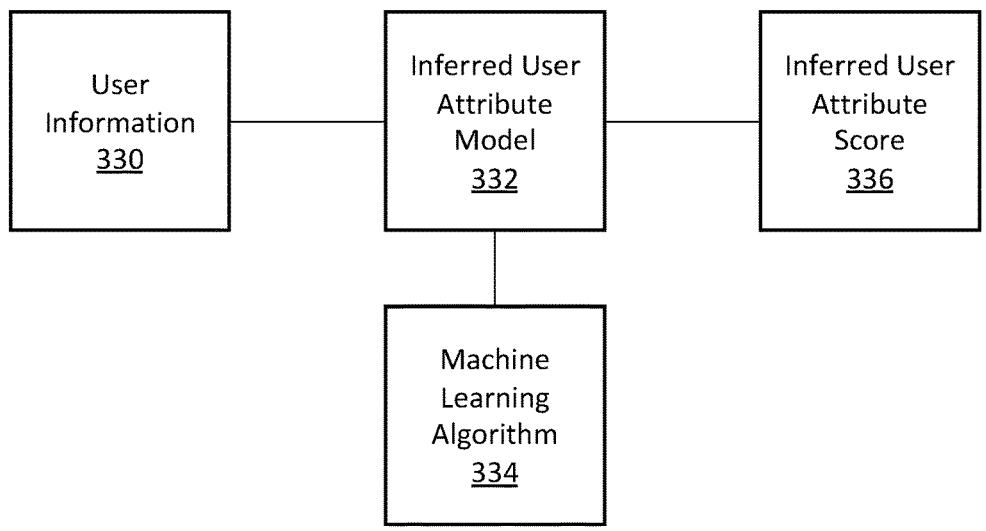
FIG. 3 illustrates a machine learning system for generating an inferred user attribute model, in accordance with one or more embodiments.

FIG. 3 illustrates a machine learning system for generating an inferred user attribute model, in accordance with one or more embodiments. As illustrated in FIG. 3, a system includes user information 330, an inferred user attribute model 332, a machine learning algorithm 334, and one or more inferred user attributes 336. In one or more embodiments, the system may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component.

In one or more embodiments, user information 330 includes information related to a particular user. User information 330 may be collected from one or more data sources. Data sources may include cookies associated with a user, web applications with personal information entered and/or shared by a user, and public data sources with public information associated with a user. User information 330 may specify a confirmable user attribute. Additionally or alternatively, user information 330 may be used to infer an inferred user attribute. Additionally or alternatively, user information 330 may be used to determine an affinity attribute.

In one or more embodiments, an inferred user attribute model 332 refers to hardware and/or software configured to determine one or more inferred user attribute scores 336 for a user based on user information 330 of the user. An inferred user attribute model 332 may include a single data model for determining one or more inferred user attribute scores 336. Alternatively, an inferred user attribute model 332 may include multiple data models for determining respective inferred user attribute scores 336. An inferred user attribute model 332 is implemented on one or more digital devices.

An inferred user attribute score 336 may be expressed within any type of data range. As an example, an inferred user attribute score may be an integer within the range 0 to 100. A higher score may represent a higher confidence level in the determination of the inferred user attribute. Additionally or alternatively, a higher score may represent a higher degree to which a user exhibits the inferred user attribute (for example, a user is an extreme sports lover, not simply a moderate sports lover). As another example, an inferred user attribute score may be a binary value, such as 0 or 1, or true or false.

In an embodiment, an inferred user attribute model 332 is trained, generated, and/or updated using machine learning. A training set for training an inferred user attribute model 332 includes historical user information of various users collected from one or more data sources. Each set of historical user information, associated with a respective user, is labeled with one or more inferred user attributes of the user. The labeled inferred user attributes may be determined via user input and/or another application.

As an example, user information of a user may indicate that the user lives at 123 Main Street, Springfield; the user recently bought a minivan; the user is on a school board of a public elementary school. The user information may be labeled with inferred user attributes, such as, the user is a parent; the user has more than one child; at least one child is in elementary school.

In one or more embodiments, a machine learning algorithm 334 is an algorithm that can be iterated to learn a target model f that best maps a set of input variables to an output variable. In particular, a machine learning algorithm 334 is configured to generate and/or train an inferred user attribute model 332. A machine learning algorithm 334 generates an inferred user attribute model 332 such that the inferred user attribute model 332 best fits the historical user information to the labeled inferred user attributes. Additionally or alternatively, a machine learning algorithm 334 generates an inferred user attribute model 332 such that when the inferred user attribute model 332 is applied to the historical user information, a maximum number of results determined by the inferred user attribute model 332 matches the labeled inferred user attributes.

A machine learning algorithm 334 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, decision trees, bagging and random forest, boosting, backpropagation. Examples of operations for applying various machine learning algorithms 334 are further described below with reference to FIG. 7.

Figure 4:
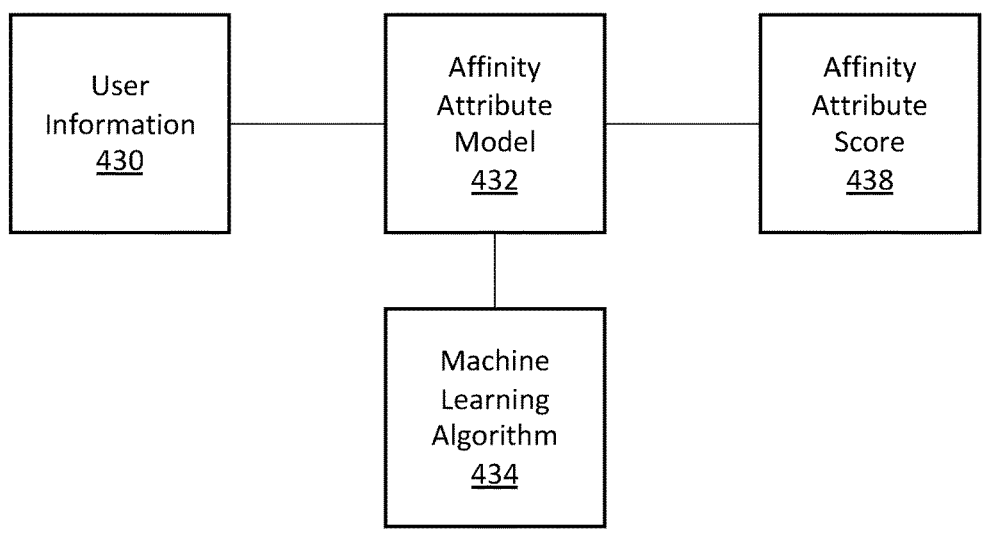
FIG. 4 illustrates a machine learning system for generating an affinity attribute model, in accordance with one or more embodiments.

FIG. 4 illustrates a machine learning system for generating an affinity attribute model, in accordance with one or more embodiments. As illustrated in FIG. 4, a system includes user information 430, an affinity attribute model 432, a machine learning algorithm 434, and one or more inferred user attributes 438. In one or more embodiments, the system may include more or fewer components than the components illustrated in FIG. 4. The components illustrated in FIG. 4 may be local to or remote from each other. The components illustrated in FIG. 4 may be implemented in software and/or hardware. Each component may be distributed over multiple applications and/or machines. Multiple components may be combined into one application and/or machine. Operations described with respect to one component may instead be performed by another component.

In one or more embodiments, an affinity attribute model 432 refers to hardware and/or software configured to determine one or more affinity attribute scores 438 for a user based on user information 430 of the user. An affinity attribute model 432 may include a single data model for determining one or more affinity attribute scores 438 for one or more product attributes. A single data model may determine positive affinity scores and/or negative affinity scores. As an example, a single affinity attribute model may determine a positive affinity attribute score for floral patterns and a positive affinity score for the color black. Alternatively, an affinity attribute model 432 may include multiple data models for determining respective affinity attribute scores 438 for respective product attributes. As an example, one affinity attribute model may determine a positive affinity towards sedan cars, another affinity attribute model may determine a negative affinity towards sedan cars, another affinity attribute model may determine a positive affinity towards hatchback cars, and another affinity attribute model may determine a negative affinity towards hatchback cars. An inferred user attribute model 332 is implemented on one or more digital devices.

An affinity attribute score 438 may be expressed within any type of data range. As an example, an affinity attribute score may be an integer within the range 0 to 100. A higher score may represent a higher confidence level in the determination of the affinity attribute. Additionally or alternatively, a higher score may represent a higher degree to which a user exhibits the affinity attribute (for example, a user has an extreme affinity towards floral patterns, not simply a moderate affinity towards floral patterns). As another example, an affinity attribute score may be a binary value, such as 0 or 1, or true or false.

In an embodiment, an affinity attribute model 432 is trained, generated, and/or updated using machine learning. A training set for training an affinity attribute model 432 includes historical user information of various users collected from one or more data sources. The historical user information may also include inferred user attributes. Each set of historical user information, associated with a respective user, is labeled with one or more affinity attributes of the user. The labeled affinity attributes may be determined via user input and/or another application.

As an example, user information of a user may indicate that the user lives at 123 Main Street, Springfield; the user made recent purchases of organic hair products; and the user made recent purchases of organic vegetables. The user information may be labeled with affinity attributes, such as, the user has a positive affinity towards organic products, and the user has a negative affinity towards non-organic products.

In one or more embodiments, a machine learning algorithm 434 is an algorithm that can be iterated to learn a target model f that best maps a set of input variables to an output variable. In particular, a machine learning algorithm 434 is configured to generate and/or train an affinity attribute model 432. A machine learning algorithm 434 generates an affinity attribute model 432 such that the affinity attribute model 432 best fits the historical user information to the labeled affinity attributes. Additionally or alternatively, a machine learning algorithm 434 generates an affinity attribute model 432 such that when the affinity attribute model 432 is applied to the historical user information, a maximum number of results determined by the affinity attribute model 432 matches the labeled affinity attributes.

A machine learning algorithm 434 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, decision trees, bagging and random forest, boosting, backpropagation. Examples of operations for applying various machine learning algorithms 434 are further described below with reference to FIG. 7.

In an embodiment, the inferred user attribute model 332 and the affinity attribute model 432 include different data models for determining inferred user attributes and affinity attributes, respectively. In another embodiment, the inferred user attribute model 332 and the affinity attribute model 432 include the same data models for determining inferred user attributes and affinity attributes.

In an embodiment, the same machine learning algorithm is used to train the inferred user attribute model 332 and the affinity attribute model 432. In another embodiment, different machine learning algorithms are used to train the inferred user attribute model 332 and the affinity attribute model 432.

4. Determining a Target Group of Users for Engaging with a Campaign

Figure 5:
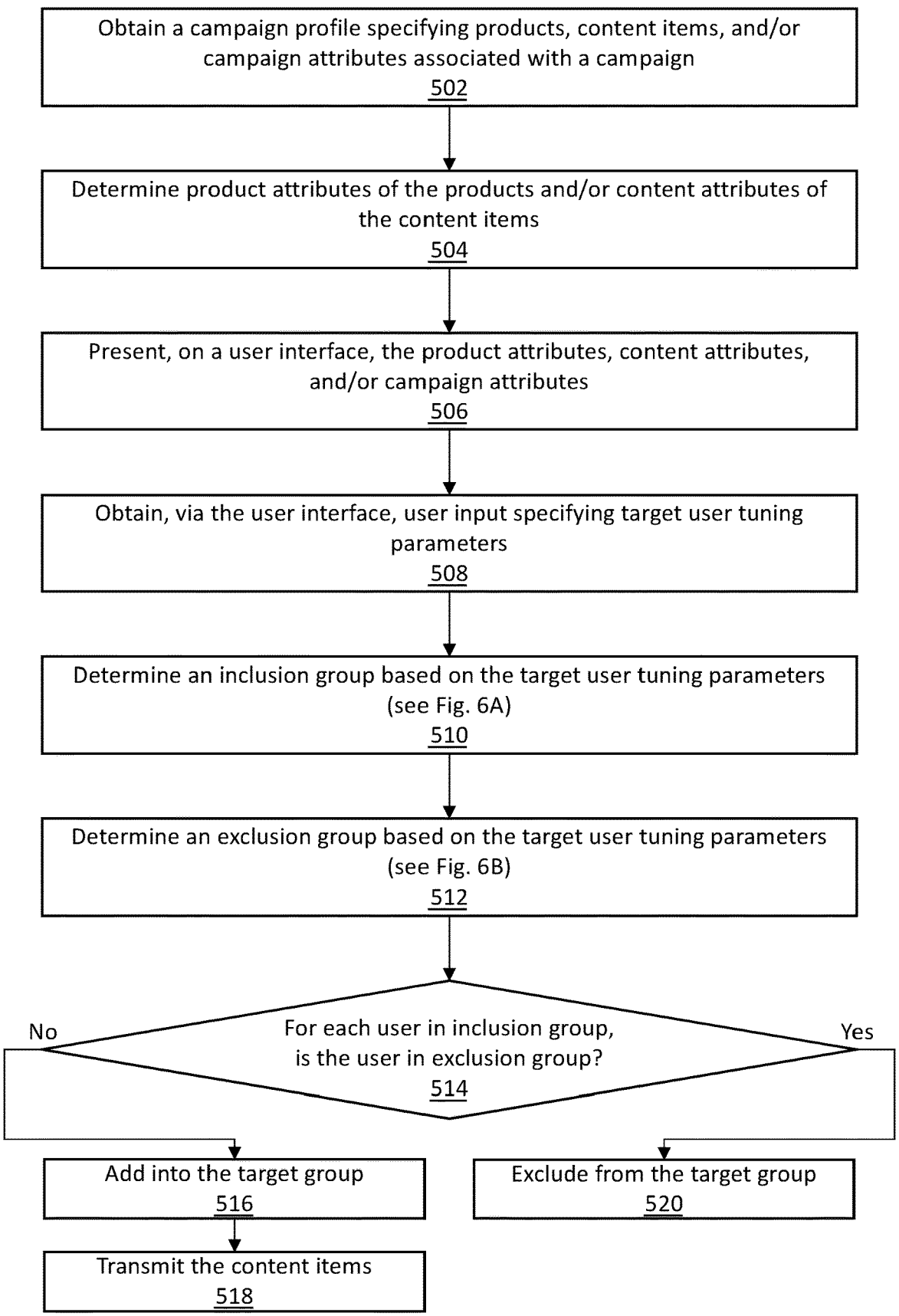
FIG. 5 illustrates an example set of operations for determining a target group of users for engaging with a campaign, in accordance with one or more embodiments.

FIG. 5 illustrates an example set of operations for determining a target group of users for engaging with a campaign, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments include obtaining a campaign profile specifying products, content items, and/or campaign attributes associated with a campaign (Operation 502). A target group selection system obtains a campaign profile from a data repository. The campaign profile specifies products that are being promoted and/or discounted in the campaign. Additionally or alternatively, the campaign profile specifies content items that would be transmitted to promote and/or bring attention to the products. Additionally or alternatively, the campaign profile specifies campaign attributes of the campaign.

One or more embodiments include obtaining product attributes of the products and/or content attributes of the content items (Operation 504). The target group selection system obtains product profiles of the products from a data repository. A product profile of a particular product specifies products attributes of the particular product. Additionally or alternatively, the target group selection system obtains product attributes that are specified in the campaign profile itself. Additionally or alternatively, the target group selection system analyzes the products to determine product attributes. The target group selection system may, for example, analyze labels of a particular product, an outward appearance of the particular product, and/or perform testing on the particular product. Based on the analysis, the target group selection system determines product attributes.

The target group selection system obtains content attributes that are specified in the campaign profile itself. As an example, a campaign profile may specify that the campaign is a clearance campaign. A target group selection system may thus determine "clearance" as a content attribute. Additionally or alternatively, the target group selection system analyzes the content items to determine content attributes. The target group selection system may, for example, perform natural language processing, keyword search, and/or other analysis on the content items. The target group selection system may, for example, analyze colors, logos, graphics, and/or fonts included in content items. Based on the analysis, the target group selection system determines content attributes.

One or more embodiments include presenting, on a user interface, the product attributes, content attributes, and/or campaign attributes (Operation 506). The target group selection system presents the product attributes and/or content attributes on a user interface. An example of a user interface is described below with reference to FIGS. 8A-B.

One or more embodiments include obtaining, via the user interface, user input specifying target user tuning parameters (Operation 508). The target group selection system obtains user input specifying target user tuning parameters (such as an inclusion range, inclusion weight, exclusion range, and/or exclusion weight) via the user interface. The target group selection system obtains user input specifying respective target user tuning parameters for confirmable user attributes, inferred user attributes, and/or affinity attributes. Target user tuning parameters may but are not necessarily specified for every user attribute included in a user profile.

In an embodiment, the target group selection system obtains target user tuning parameters for product-specific affinity attributes, content-specific affinity attributes, and/or campaign-specific affinity attributes. As described above, product attributes, content attributes, and/or campaign attributes associated with the campaign are determined at Operations 502-504. The target group selection system may receive inclusion ranges and/or inclusion weights for positive affinity attributes towards one or more of the product attributes, content attributes, and/or campaign attributes associated with the campaign. The target group selection system may receive exclusion ranges and/or exclusion weights for negative affinity attributes towards one or more of the product attributes, content attributes, and/or campaign attributes associated with the campaign. The target group selection system may receive inclusion ranges and/or inclusion weights for negative affinity attributes towards one or more product attributes, content attributes, and/or campaign attributes that are not associated with the campaign. The target group selection system may receive exclusion ranges and/or exclusion weights for positive affinity attributes towards one or more product attributes, content attributes, and/or campaign attributes that are not associated with the campaign.

As an example, a campaign may promote products with striped patterns. An administrator may determine that users who favor striped patterns should be included in a target group. The administrator may hence specify an inclusion weight applicable to a positive affinity attribute towards striped patterns. The administrator may determine that users who disfavor striped patterns should be excluded from the target group. The administrator may hence specify an exclusion weight applicable to a negative affinity attribute towards striped patterns. Hence, a target group selection system obtains target user tuning parameters for product-specific affinity attributes, content-specific affinity attributes, and/or campaign-specific affinity attributes via a user interface.

As another example, a product attribute hierarchy may include a top node associated with a product type, "clothing." Two child nodes of the "clothing" node may be respectively associated with the product types, "tops" and "bottoms." Two child nodes of the "bottoms" node may be respectively associated with the styles, "solid colors" and "patterned." Two child nodes of the "patterned" node may be respectively associated with the patterns, "striped pattern" and "polka dot pattern."

A campaign may promote products with striped patterns. Based on the product attribute hierarchy, product attributes associated with the campaign include: "striped pattern," "patterned," "bottoms," and "clothing." Product attributes not associated with the campaign include, for example: "polka dot pattern," "solid colors," and "tops." Other product attributes not listed in the product attribute hierarchy may also be considered as being not associated with the campaign, such as "floral pattern," and "shoes."

An administrator may determine that users who favor the "patterned" style should be included in a target group. The administrator may hence specify an inclusion weight applicable to a positive affinity attribute towards "patterned."

The administrator may determine that users who disfavor the "striped pattern" should be excluded from the target group. The administrator may hence specify an exclusion weight applicable to a negative affinity attribute towards "striped pattern."

The administrator may determine that users who favor the "solid colors" style should be excluded from the target group. The administrator may hence specify an exclusion weight applicable to a positive affinity towards "solid colors."

The administrator may determine that users who disfavor "tops" should be included in the target group. The administrator may hence specify an inclusion weight applicable to a negative affinity towards "tops."

As shown in the above example, a target group selection system obtains target user tuning parameters for product-specific affinity attributes, content-specific affinity attributes, and/or campaign-specific affinity attributes via a user interface.

Hence, target user tuning parameters may specify a degree to which affinity towards product attributes specific to the campaign are taken into account when determining a target group of users. Additionally or alternatively, the target user tuning parameters may specify a degree to which affinity towards content attributes specific to the campaign are taken into account when determining the target group of users. Additionally or alternatively, the target user tuning parameters may specify a degree to which affinity towards campaign attributes specific to the campaign are taken into account when determining the target group of users.

In an embodiment, the user interface for receiving target user tuning parameters is a graphical user interface (GUI) configured to accept drag-and-drop user input. The GUI may include a selection region and a configuration region. The target group selection system may present the product attributes, content attributes, and/or campaign attributes in the selection region. An administrator may select an icon representing a particular product attribute, content attribute, and/or campaign attribute from the selection region and drag the icon to the configuration region. The administrator may then enter target user tuning parameters applicable to affinity attributes for the particular product attribute and/or content attribute. Additionally or alternatively, the administrator may enter user attributes, not displayed in the selection region, into the configuration region. The administrator may review the displayed product attributes and/or content attributes to determine confirmable user attributes and/or inferred user attributes relevant to the campaign. The administrator may then enter target user tuning parameters applicable to the relevant user attributes. An example of a user interface is described below with reference to FIGS. 8A-B.

In an embodiment, the target group selection system generates an inclusion score function and/or exclusion score function based on the target user tuning parameters. The inclusion score function and/or exclusion score function specifies which target user tuning parameters are applicable to which user attributes of a user profile.

In an alternative embodiment, the target group selection system determines target user tuning parameters based on a campaign profile, without a user directly specifying the target user tuning parameters via a user interface. In particular, the target group selection system obtains a campaign profile (which may have been specified via user input and/or by another application). The target group selection system determines products associated with the campaign based on the campaign profile, without further user input. The target group selection system determines product attributes of the products based on product profiles and/or product analysis, without user input. The target group selection system determines content items associated with the campaign based on the campaign profile, without further user input. The target group selection system determines content attributes of the content items based on content analysis, without user input. The target group selection system determines campaign attributes based on the campaign profile, without further user input. The target group selection system then determines inclusion weights for affinity attributes towards the product attributes, content attributes, and/or campaign attributes, based on various possible methods, examples of which are described below.

The inclusion weights for affinity attributes towards the product attributes, content attributes, and/or campaign attributes may be equal. For example, if a campaign is associated with two product attributes and three content attributes, inclusion weights for affinity towards each attribute may be 20%.

Additionally or alternatively, the inclusion weights for affinity attributes towards the product attributes may be determined based on a product attribute hierarchy. Greater weight may be given to product attributes that are more specific, that is, product attributes that are lower in the product attribute hierarchy. As an example, a data repository may store two product attribute hierarchies. A first product attribute hierarchy may include a top node associated with "clothing." Two child nodes of the "clothing" node may be respectively associated with "tops" and "bottoms." A second product attribute hierarchy may include a top node associated with "patterned." Two child nodes of the "patterned" node may be respectively associated with "striped pattern" and "polka dot pattern."

A product profile of a product associated with a campaign may specify the following product attributes: "bottoms" and "patterned." The "bottoms" attribute is associated with a second level in the first hierarchy, while the "patterned" attribute is associated with a first level in the second hierarchy. Therefore, the "bottoms" attribute is associated with a lower hierarchical level. Hence, a greater inclusion weight may be given to "bottoms" than to "patterned." The difference in inclusion weights to "bottoms" and "patterned" may be proportional to the difference in hierarchical levels associated with "bottoms" and "patterned." Hence, inclusion weights are determined for affinity attributes towards "bottoms" and "patterned," without user input.

Additionally or alternatively, the inclusion weights for affinity attributes towards the product attributes may be determined based on revenue and/or profit generated by products associated with the product attributes. As an example, a sales application may indicate that the revenue generated by each of a list of products (such as bicycles). Product profiles may specify product attributes of each bicycle. Hence, a target group selection system may determine that bicycles with the product attribute "with kickstands" generate a greater revenue than bicycles without the product attribute. Meanwhile, the target group selection system may determine that there is an insignificant difference in generated revenue for bicycles of different colors. Hence, the target group selection system may apply a greater inclusion weight for an affinity attribute towards "with kickstands," as compared to inclusion weights for an affinity attribute towards "blue," "pink," and other colors.

One or more embodiments include determining an inclusion group based on the target user tuning parameters (Operation 510). The target group selection system determines an inclusion group of users by applying the target user tuning parameters to user profiles of a set of users. Examples of operations for determining an inclusion group are described below with reference to FIG. 6A.

One or more embodiments include determining an exclusion group based on the target user tuning parameters (Operation 512). The target group selection system determines an exclusion group of users by applying the target user tuning parameters to the user profiles of the set of users. Examples of operations for determining an inclusion group are described below with reference to FIG. 6B.

One or more embodiments include determining, for each user in the inclusion group, whether the user is also in the exclusion group (Operation 514). The target group selection system traverses through each user in the inclusion group to determine whether the user is also in the exclusion group.

If a particular user is in the inclusion group and in the exclusion group, one or more embodiments include excluding the particular user from the target group (Operation 520). The target group selection system excludes each user that is in the inclusion group and in the exclusion group from the target group of users.

The target group selection system does not add any user who is not in the inclusion group into the target group of users.

If a particular user is in the inclusion group but not in the exclusion group, one or more embodiments include adding the particular user into the target group (Operation 516). The target group selection system adds each user that is in the inclusion group but not in the exclusion group into the target group of users.

One or more embodiments include transmitting the content items to the target group (Operation 518). The target group selection system transmits the content items to the target group of users. The target group selection system does not transmit the content items to other users who are not in the target group.

The target group selection system may, for example, transmit emails including the content items to the target group. The target group selection system may present video content and/or audio content to the target group. The target group selection system may cause mailing labels to be printed for the target group, for physically mailing the content items to the target group.

Based on the operations of FIG. 5, the target group selection system determines a target group of users for engaging with a campaign. In an embodiment, the target group is selected based at least on product-specific affinity attributes and/or content-specific affinity attributes. In an embodiment, the target group is selected based on a weighted consideration of product-specific affinity attributes, content-specific affinity attributes, and/or other user attributes.

Figure 6A:
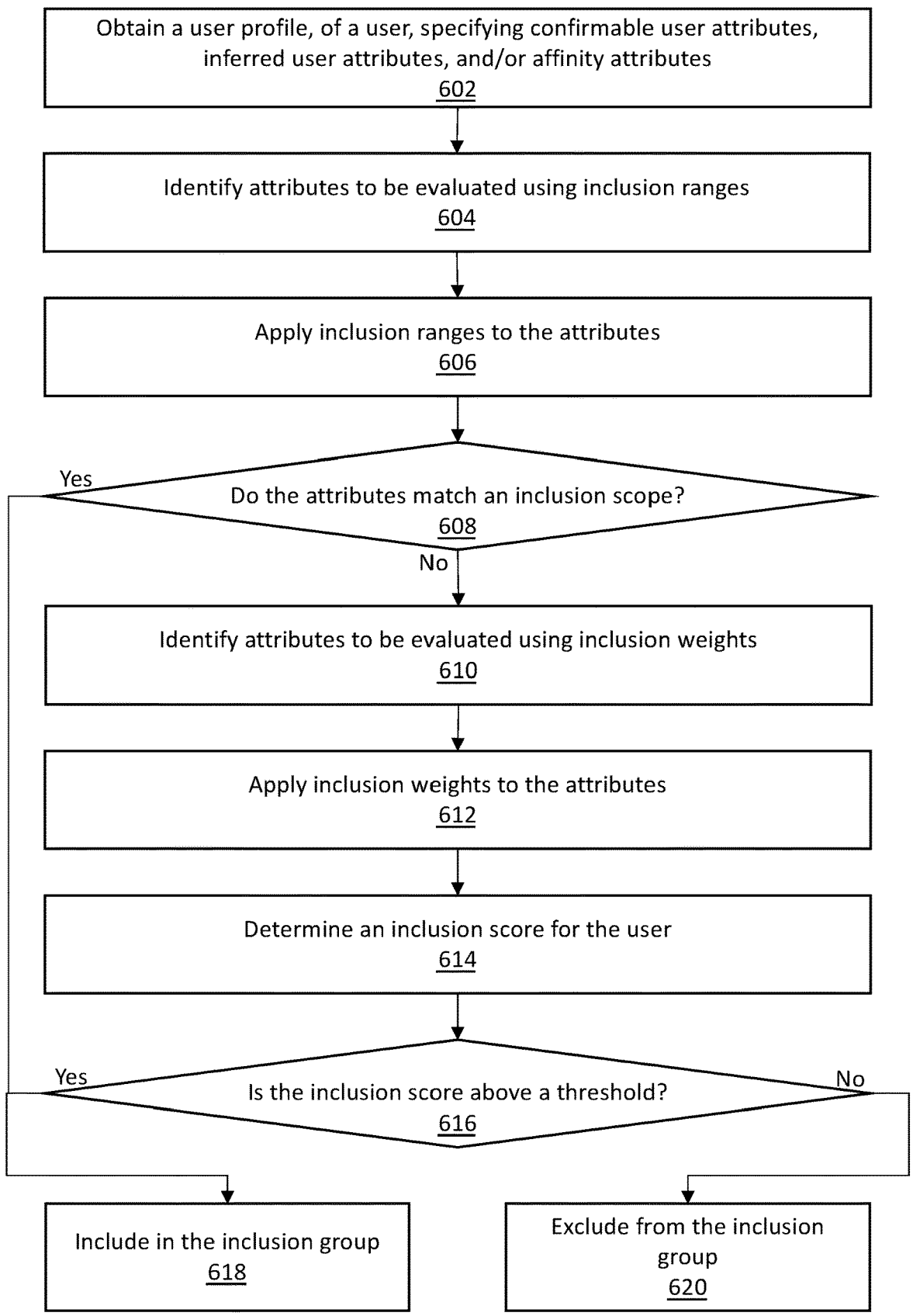
FIGS. 6A-B illustrate example sets of operations for determining an inclusion group of users and an exclusion group of users, in accordance with one or more embodiments.
Figure 6B:
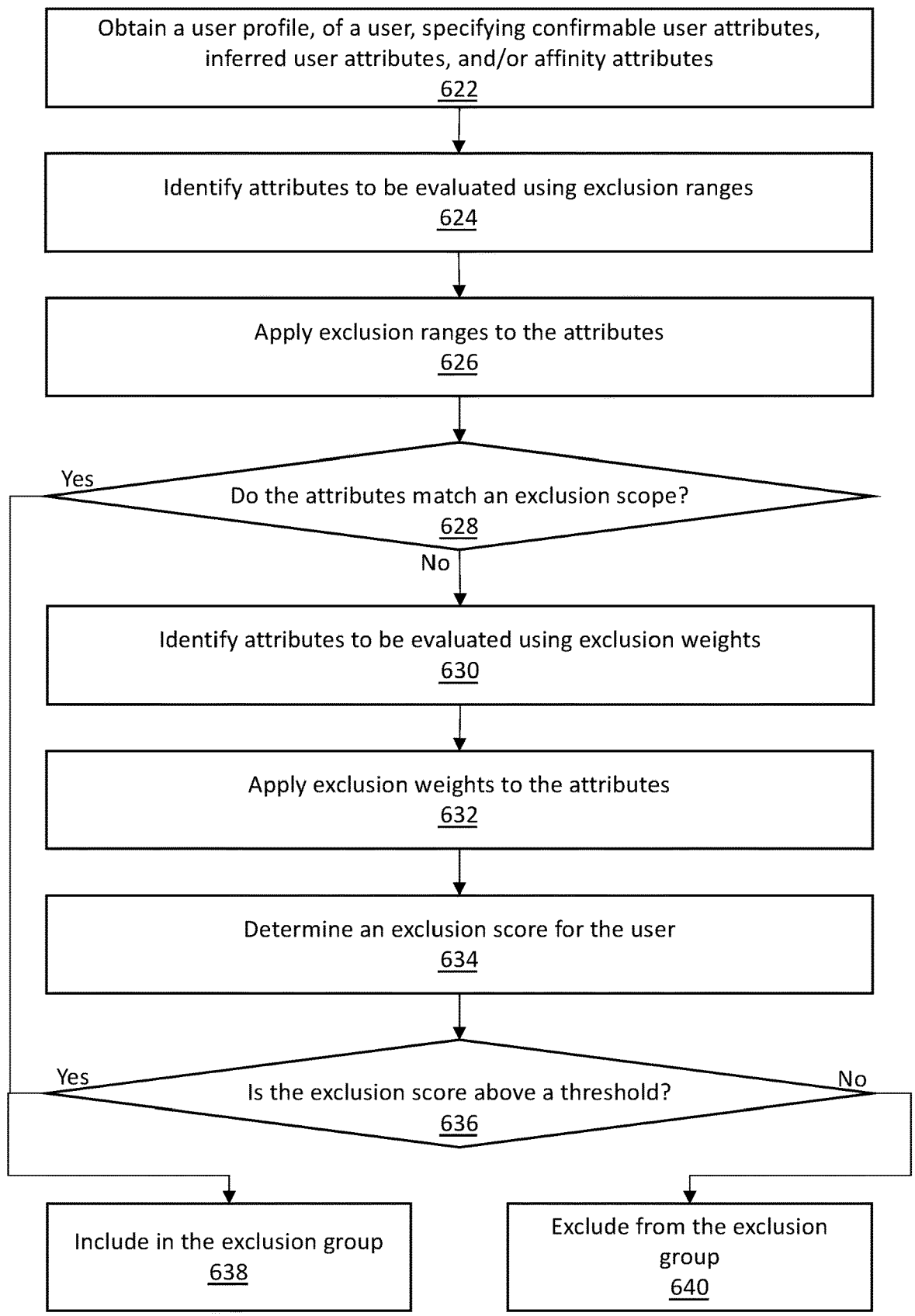

FIGS. 6A-B illustrate example sets of operations for determining an inclusion group of users and an exclusion group of users, in accordance with one or more embodiments. One or more operations illustrated in FIGS. 6A-B may be modified, rearranged, or omitted all together. Accordingly, the particular sequence of operations illustrated in FIGS. 6A-B should not be construed as limiting the scope of one or more embodiments.

Referring to FIG. 6A, one or more embodiments include obtaining a user profile, of a user, specifying confirmable user attributes, inferred user attributes, and/or affinity attributes (Operation 602). A target group selection system obtains a user profile of a user.

The target group selection system may retrieve the user profile from a data repository. The user profile may be generated based on user input and/or another application.

Additionally or alternatively, the target group selection system may generate and/or enhance the user profile. Examples of operations for using machine learning to generate and/or enhance a user profile are described below with reference to FIG. 7. Additional and/or alternative methods for generating and/or enhancing a user profile may be used. As an example, a rule-based system, a lookup table, and/or a user-defined function may be used for generating a user profile.

One or more embodiments include identifying attributes to be evaluated using inclusion ranges (Operation 604). The target group selection system identifies attributes to be evaluated using inclusion ranges, as specified by a set of target user tuning parameters. If the target user tuning parameters specify an inclusion range for a particular attribute (such as a confirmable user attribute, inferred user attribute, and/or affinity attribute), then the particular attribute is evaluated using the inclusion range. If the target user tuning parameters do not specify an inclusion range for a particular attribute (such as a confirmable user attribute, inferred user attribute, and/or affinity attribute), then the particular attribute is not evaluated using any inclusion range.

One or more embodiments include applying inclusion ranges to the attributes (Operation 606). The target group selection system applies the inclusion ranges respectively to the attributes.

As an example, a set of target user tuning parameters may specify the following:

TABLE 1

| User Attribute | Inclusion Range/Weight | Value |
| --- | --- | --- |
| The user is a college student | Weight | 50% |
| The user has a positive affinity towards BrandXYZ computer products | Range | 90-100 |

Based on the target user tuning parameters, a target group selection system may evaluate the user attribute, "college student," using an inclusion weight. The target group selection system may evaluate the user attribute, "positive affinity towards BrandXYZ computer products," using an inclusion range. The target group selection system may apply the range [90-100] to the user attribute, "positive affinity towards BrandXYZ computer products."

In an embodiment, the target group selection system obtains an inclusion score function, generated based on one or more target user tuning parameters. The inclusion score function is configured to apply one or more inclusion ranges respectively to one or more user attributes. The target group selection system inputs user attributes specified in the user profile into the inclusion score function. Based on the inclusion score function, the target group selection system applies inclusion ranges to the applicable user attributes.

One or more embodiments include determining whether the attributes match an inclusion scope (Operation 608). The target user tuning parameters may specify an inclusion scope that requires all inclusion ranges to be satisfied. Alternatively, the target user tuning parameters may specify an inclusion scope that requires only a subset of inclusion ranges to be satisfied. If the inclusion scope is satisfied, then the user is added into the inclusion group (Operation 618). The target group selection system may optionally determine an "inclusion score" for the user that is above the threshold value evaluated at Operation 616 described below. If the inclusion scope is not satisfied, then the user is excluded from the inclusion group (Operation 620). The target group selection system may optionally determine an "inclusion score" for the user that is not above the threshold value evaluated at Operation 616 described below.

As an example, target user tuning parameters may include applying a range [90-100] to a user attribute, "positive affinity towards BrandXYZ computer products" and applying a range [85-100] to a user attribute, "negative affinity towards cartoon characters."

If an inclusion scope requires all inclusion ranges to be satisfied, then a user is included in an inclusion group only if the user has both (a) a 90-100 positive affinity score towards BrandXYZ computer products, and (b) an 85-100 negative affinity score towards cartoon characters.

If an inclusion scope requires only one inclusion range to be satisfied, then a user is included in an inclusion group if the user has either (a) a 90-100 positive affinity score towards BrandXYZ computer products, or (b) an 85-100 negative affinity score towards cartoon characters.

As another example, target user tuning parameters may include applying a range [90-100] to a user attribute, "positive affinity towards BrandXYZ computer products"; applying a range [95-100] to a user attribute, "positive affinity towards high-end audio products"; and applying a range [85-100] to a user attribute, "negative affinity towards cartoon characters." The target user tuning parameters may further specify an inclusion scope that requires:

(a) satisfying the range [90-100] for the user attribute, "positive affinity towards BrandXYZ computer products"; or (b) satisfying the range [95-100] for the user attribute, "positive affinity towards high-end audio products," and the range [85-100] for the user attribute, "negative affinity towards cartoon characters."

A user Joe may have a positive affinity score of 95 towards BrandXYZ computer products, a positive affinity score of 70 towards high-end audio products, and an 89 negative affinity score towards cartoon characters. Since Joe satisfies the range [90-100] for the user attribute, "positive affinity towards BrandXYZ computer products," a target group selection system adds Joe to an inclusion group.

Another user Mary may have a positive affinity score of 86 towards BrandXYZ computer products, a positive affinity score of 96 towards high-end audio products, and a 70 negative affinity score towards cartoon characters. Mary does not satisfy the range [90-100] for the user attribute, "positive affinity towards BrandXYZ computer products." Further, although Mary satisfies the range [95-100] for the user attribute, "positive affinity towards high-end audio products," Mary does not satisfy the range [85-100] for the user attribute, "negative affinity towards cartoon characters." Therefore, the target group selection system does not add Mary to the inclusion group.

Another user Janet may have a positive affinity score of 84 towards BrandXYZ computer products, a positive affinity score of 97 towards high-end audio products, and a 90 negative affinity score towards cartoon characters. Since Janet satisfies the range [95-100] for the user attribute, "positive affinity towards high-end audio products," and the range [85-100] for the user attribute, "negative affinity towards cartoon characters," the target group selection system adds Janet to the inclusion group.

One or more embodiments include identifying attributes to be evaluated using inclusion weights (Operation 610). The target group selection system identifies attributes to be evaluated using inclusion weights, as specified by the set of target user tuning parameters. If the target user tuning parameters specify an inclusion weight for a particular attribute (such as a confirmable user attribute, inferred user attribute, and/or affinity attribute), then the particular attribute is evaluated using the inclusion weight. If the target user tuning parameters do not specify an inclusion weight for a particular attribute (such as a confirmable user attribute, inferred user attribute, and/or affinity attribute), then the particular attribute is not evaluated using any inclusion weight. A particular attribute may be evaluated by an inclusion range; an inclusion weight; both an inclusion range and an inclusion weight; or neither an inclusion range nor an inclusion weight.

As an example, a set of target user tuning parameters may specify the following:

TABLE 2

| User Attribute | Inclusion Range/Weight | Value |
| --- | --- | --- |
| The user is a college student | Weight | 60% |
| The user has a positive affinity towards BrandXYZ computer products | Weight | 40% |
| The user has a positive affinity towards BrandXYZ computer products | Range | 90-100 |

A user profile for John may indicate an inferred user attribute score for "college student" is 65. The user profile may indicate a positive affinity score towards BrandXYZ computer products is 55.

A target group selection system may first apply the inclusion range [90-100] to the user attribute, "positive affinity towards BrandXYZ computer products." Since John's positive affinity score for BrandXYZ computer products is 55, the inclusion range is not satisfied.

The target group selection system may then apply inclusion weights. The target group selection system may apply the weight 60% to the user attribute, "college student," and the weight 40% to the user attribute, "positive affinity towards BrandXYZ computer products." The target group selection system may compute the sum 0.6×65+0.4×55=61. The inclusion score for John may hence be determined as 61.

In the above example, the user attribute, "positive affinity towards BrandXYZ computer products," is evaluated first with respect to an inclusion range and then with respect to an inclusion weight. Hence, if a user attribute does not satisfy an inclusion range, the user attribute may still be taken into account when computing an inclusion score.

One or more embodiments include applying inclusion weights to the attributes (Operation 612). The target group selection system applies the inclusion weights respectively to the attributes.

As an example, a set of target user tuning parameters may specify the following:

TABLE 3

| User Attribute | Inclusion Range/Weight | Value |
| --- | --- | --- |
| The user is a college student | Weight | 50% |
| The user has a positive affinity towards BrandXYZ computer products | Range | 90-100 |

Based on the target user tuning parameters, a target group selection system may evaluate the user attribute, "college student," using an inclusion weight. The target group selection system may evaluate the user attribute, "positive affinity towards BrandXYZ computer products," using an inclusion range. The target group selection system may apply the weight 50% to the user attribute, "college student."

In an embodiment, the target group selection system obtains an inclusion score function, generated based on one or more target user tuning parameters. The inclusion score function is configured to apply one or more inclusion weights respectively to one or more user attributes. The target group selection system inputs user attributes specified in the user profile into the inclusion score function. Based on the inclusion score function, the target group selection system applies inclusion weights to the applicable user attributes.

One or more embodiments include determining an inclusion score for the user (Operation 614). The target group selection system determines an inclusion score for the user. In an embodiment, the inclusion score is a weighted sum of the attributes. As an example, an inclusion weight of 60% may be applicable to the user attribute, "college student." An inclusion weight of 40% may be applicable to the user attribute, "positive affinity towards BrandXYZ computer products." A target group selection system may compute the weighted sum, 0.6×[inferred user attribute score for "college student"]+0.4×[positive affinity score for BrandXYZ computer products], to determine an inclusion score. Additional and/or alternative functions for determining an inclusion score based on applying respective weights to respective attributes may be used.

In an embodiment, by applying weights to user attributes, a user is not necessarily excluded from an inclusion group based on a hard filter. As an example, an inclusion score function may be 0.4×[inferred user attribute score for "college student"]+0.2×[confirmable user attribute for "female"]+0.1×[confirmable user attribute for "age between 18 and 25"]+0.1×[positive affinity towards "floral patterns"]+0.2×[negative affinity towards "short dresses"]. Based on the above inclusion score function, the "college student" inferred user attribute is considered a significant factor for including a user in an inclusion group. However, even a user who is not a college student may be included in the inclusion group, if the user is a female, is between 18 and 25 years old, has positive affinity towards "floral patterns," and/or has negative affinity towards "short dresses."

One or more embodiments include determining whether the inclusion score is above a threshold value (Operation 616). The target group selection system compares the inclusion score with a threshold value. If the inclusion score is above the threshold value, then the user is added into the inclusion group (Operation 618). If the inclusion score is not above the threshold value, then the user is excluded from the inclusion group (Operation 620).

Referring to FIG. 6B, the operations of FIG. 6B are similar to the operations of FIG. 6A. The operations of FIG. 6B are applied with respect to exclusion ranges, exclusion weights, an exclusion score, and an exclusion group, whereas the operations of FIG. 6A are applied with respect to inclusion ranges, inclusion weights, an inclusion score, and an inclusion group One or more embodiments include obtaining a user profile, of a user, specifying confirmable user attributes, inferred user attributes, and/or affinity attributes (Operation 622). Examples of operations for obtaining a user profile are described above with reference to Operation 602.

One or more embodiments include identifying attributes to be evaluated using exclusion ranges (Operation 624). Examples of operations for identifying attributes to be evaluated using ranges (such as inclusion ranges) are described above with reference to Operation 604.

One or more embodiments include applying exclusion ranges to the attributes (Operation 626). Examples of operations for applying ranges (such as inclusion ranges) to attributes are described above with reference to Operation 606.

One or more embodiments include determining whether the attributes match an exclusion scope (Operation 628). Examples of operations for determining whether attributes match a scope (such as an inclusion scope) are described above with reference to Operation 608.

If the exclusion scope is satisfied, then the user is added into the exclusion group (Operation 638). The target group selection system may optionally determine an "exclusion score" for the user that is above the threshold value evaluated at Operation 636 described below. If the exclusion scope is not satisfied, then the user is excluded from the exclusion group (Operation 620). The target group selection system may optionally determine an "exclusion score" for the user that is not above the threshold value evaluated at Operation 636 described below.

One or more embodiments include identifying attributes to be evaluated using exclusion weights (Operation 630). Examples of operations for identifying attributes to be evaluated using weights (such as exclusion weights) are described above with reference to Operation 610.

One or more embodiments include applying inclusion weights to the attributes (Operation 632). Examples of operations for applying weights (such as inclusion weights) to attributes are described above with reference to Operation 612.

One or more embodiments include determining an inclusion score for the user (Operation 634). Examples of operations for determining a score (such as an inclusion score) for a user are described above with reference to Operation 614.

One or more embodiments include determining whether the exclusion score is above a threshold value (Operation 636). The target group selection system compares the exclusion score with a threshold value. If the exclusion score is above the threshold value, then the user is added into the exclusion group (Operation 638). If the exclusion score is not above the threshold value, then the user is excluded from the exclusion group (Operation 640).

In an embodiment, the target group selection engine may iterate the operations of FIG. 6A and/or FIG. 6B with respect to each user profile. The target group selection engine may hence determine whether to add each user, associated with each user profile, to the inclusion group and/or exclusion group.

Figure 7:
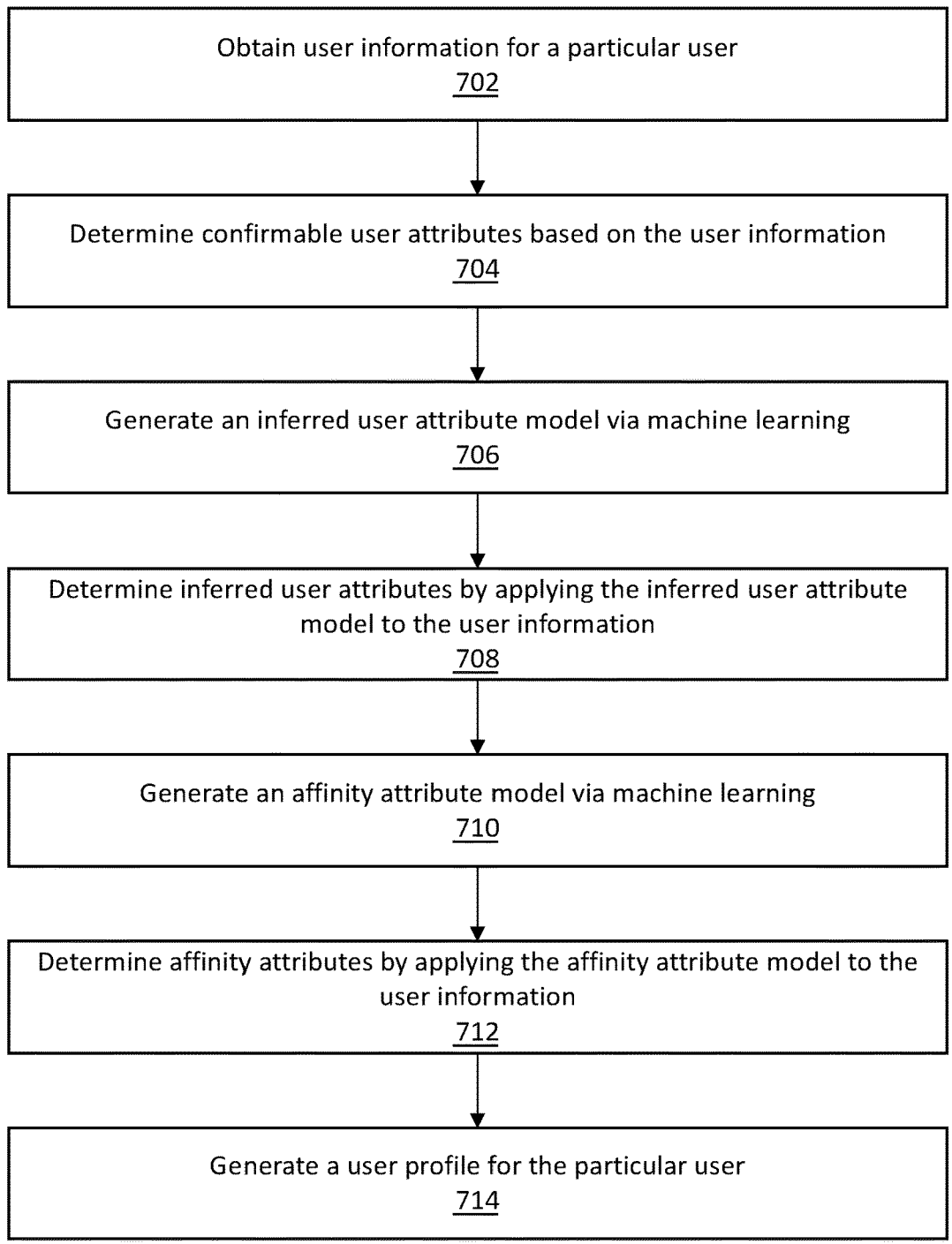
FIG. 7 illustrates an example set of operations for using machine learning to generate models for generating and/or enhancing user profiles, in accordance with one or more embodiments.

5. Using Machine Learning to Generate Models for Generating and/or Enhancing User Profiles FIG. 7 illustrates an example set of operations for using machine learning to generate models for generating and/or enhancing user profiles, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include obtaining user information for a particular user (Operation 702). A target group selection system obtains user information from one or more data sources. Data sources may include cookies associated with the particular user, web applications with personal information entered and/or shared by the particular user, public data sources with public information associated with the particular user, and/or any other sources.

One or more embodiments include determining confirmable user attributes based on the user information (Operation 704). The target group selection system determines confirmable user attributes based on the user information. As an example, Alan may share personal information on a social media website, indicating that her birthday is Dec. 12, 1982. A target group selection system may obtain the personal information from the social media website. The target group selection system may determine that a confirmable user attribute of Alan is that Alan's birthday is on Dec. 12, 1982.

In an embodiment, the target group selection system checks which confirmable user attributes are required as input for determining whether to add the user to the inclusion group and/or exclusion group, as described above with reference to FIGS. 6A-B. In particular, the target group selection system checks which attributes are to be evaluated using inclusion ranges and/or inclusion weights at Operations 604 and 610. The target group selection system checks which attributes are to be evaluated using exclusion ranges and/or exclusion weights at Operations 624 and 630. The target group selection system then analyzes the user information obtained at Operation 702 to determine the required confirmable user attributes. The target group selection system may but does not necessarily determine any other confirmable user attributes from the user information.

One or more embodiments include generating an inferred user attribute model via machine learning (Operation 706). A machine learning system (which may be but is not necessarily a part of the target group selection system) generates an inferred user attribute model via machine learning.

The machine learning system obtains a training set for training the inferred user attribute model. The machine learning system obtains historical user information from one or more data sources. As described above, data sources may include cookies associated with the particular user, web applications with personal information entered and/or shared by the particular user, public data sources with public information associated with the particular user, and/or any other sources. The training set is labeled with inferred user attributes, which may be determined based on user input and/or another application.

As an example, a machine learning system may obtain the following training set:

TABLE 4

| User Information | Labeled Inferred User Attribute |
| --- | --- |
| Name: Mary<br>Birthday: Dec. 6, 1982<br>Occupation: Attorney<br>Web Interaction History: Visited sportsnews.com on Oct. 1, 2019; visited investment.com on Oct. 2, 2019; visited basketballteam.com on Oct. 2, 2019 | Sports Lover<br>Investor |
| Name: John<br>Geographical Location: Los Angeles, CA<br>Education: Graduated UCLA in 2007<br>Web Interaction History: Visited uclafootballteam.com on Oct. 3, 2019; visited restaurantabc.com on Oct. 3, 2019 | Sports Lover<br>Foodie |
| Name: [Not Found]<br>Geographical Location: Burbank, CA<br>Birthday: May 5, 2001<br>Web Interaction History: Visited socialmediabook.com on Oct. 2, 2019; visited socialmediabook.com on Oct. 3, 2019 | Extrovert |

In an embodiment, the labeled inferred user attributes are also associated with a score. The score may indicate a degree to which a particular set of user information exhibits the labeled inferred user attribute. In the example training set above, for example, the first set of user information (associated with Mary) may be associated with the labeled inferred user attribute "Sports Lover" and a score of 80. The second set of user information (associated with John) may be associated with the labeled inferred user attribute "Sports Lover" and a score of 70. The scores indicate that Mary is more of a sports lover than John.

The machine learning system applies a machine learning algorithm to the training set to generate an inferred user attribute model. Various machine learning algorithms may be used, examples of which are described below.

In an embodiment, a regression algorithm is used. The machine learning system determines a regression function form. The regression function form includes a set of weights applicable to a set of raw attributes derived from a set of user information. As an example, each geographical location may be coded as a unique numerical value. Los Angeles may be coded as 1 and Burbank may be coded as 2. The encoded geographical locations may be used as attributes in a regression function form. As another example, each geographical location may be coded based on a distance from a reference location (such as a store address). The encoded geographical locations may be used as attributes in a regression function form.

As an example, a regression function form may be:

$$Y = \beta_0 + \beta_1 x_1 + \beta_2 x_2 + \ldots + \varepsilon$$

wherein Y is the output variable, which in this case, are the inferred user attributes; $x_i$ are the attributes derived from user information; $\varepsilon$ is an error variable; and $\beta_i$ are the weights applied to the attributes.

Alternative regression function forms may also be used. Various regression function forms may be associated with different types of regression, such as ordinary least squares regression, linear regression, non-linear regression, logistic regression, stepwise regression, polynomial regression, binomial regression, binary regression, non-parametric regression, multivariate adaptive regression spline, and locally estimated scatterplot smoothing regression.

Additionally, the machine learning system determines an error measurement function. The error measurement function is configured to determine an error between (a) a set of inferred user attributes determined by applying the regression function form, having a particular set of values for the set of weights, to the historical user information, and (b) the labeled inferred user attributes. An error may be represented as:

$$e = Y - \hat{Y}$$

wherein Y represents values of the output variable from a regression function based on the historical user information; and $\hat{Y}$ represents the values of the labeled inferred user attributes.

As an example, an error estimation function may be:

$$SSR = \sum_{i=1}^{n} e_i^2$$

Alternative error measurement functions may also be used. An example of an error measurement function is a sum of squared differences between (a) the set of inferred user attributes determined by applying a regression function to the historical user information, and (b) the labeled user attributes.

Thereafter, the machine learning system determines a "best" set of values for the set of weights $\beta_i$ in the regression function form, such that the error, determined by the error measurement function, is minimized. The best values for the set of weights $\beta_i$ are applied to the regression function form to generate a regression function. The inferred user attribute model may utilize the regression function to determine inferred user attributes for any user.

In an embodiment, a k-nearest neighbors (knn) algorithm is used. The machine learning system generates the inferred user attribute model by storing (a) attributes derived from the historical user information and (b) corresponding labeled inferred user attributes. The machine learning system may store the data as a set of numerical values and/or a graph. The data forms a knn data model. The inferred user attribute model may utilize the knn data model to determine inferred user attributes for any user.

In an embodiment, a decision tree learning algorithm is used. The machine learning system determines a split quality function. The split quality function is configured to determine a quality of a split in a decision tree. A quality of a split may depend on the homogeneity of the output variable (which are the labeled inferred user attributes) within the subsets created by the split.

Thereafter the machine learning system iteratively selects a respective attribute derived from the historical user information as a respective variable for a respective split of the decision tree. The machine learning system may work from the top down, from the root node to the leaf nodes. The machine learning system selects each attribute for each split, such that a quality of the split as determined by the split quality function is maximized.

As an example, a set of attributes may be derived from a set of historical user information. A machine learning system may select an attribute, from the set of attributes, as a variable for a first split of the decision tree, such that a quality of the first split as determined by the split quality function is maximized. Then the machine learning system may select another attribute, from the remaining set of attributes, as a variable for a second split of the decision tree, such that a quality of the second split as determined by the split quality function is maximized. Hence, the machine learning system may iterate the above procedure with respect to each split in the decision tree.

The machine learning system thereby generates a decision tree. The inferred user attribute model may utilize the decision tree to determine inferred user attributes for any user. In an embodiment, the inferred user attribute model may include multiple decision trees, may be used as a random forest decision tree.

In an embodiment, an artificial neural network (ANN) and/or deep learning algorithm is used. The machine learning system generates one or more input layers, one or more hidden layers, and an output layer of the ANN. The inferred user attribute model may utilize the ANN to determine inferred user attributes for any user.

Each hidden layer includes one or more neurons and/or processing nodes. A neuron is associated with (a) a weighted summation and (b) an activation function. The weighted summation is associated with a set of weights, respectively applicable to a set of inputs to the neuron. Where an input is a vector, the applicable weight is also a vector. A dot product is computed between each input vector and the applicable weight vector. The sum of the dot products (plus optionally a weighted bias value) may be referred to as a "state." The activation function takes the state as an input and normalizes the result (generally, a value between 0 and 1). The activation function may be, for example, a sigmoid function (such as a logistic function, or a hyperbolic tangent function), or any other function. Generally, the weights and activation function are learned using machine learning (such as backpropagation), however other methods for setting the weights and activation function may be used.

The machine learning system determines types of hidden layers to be used. Types of hidden layers may include a fully connected layer, a convolutional layer, a max pooling layer, and/or other layers.

A fully connected layer includes a set of neurons that are fully connected with a previous input layer or hidden layer. Each neuron of the fully connected layer is connected to each neuron of the previous layer.

A convolutional layer includes a set of neurons, each of which is connected only with a subset of neurons from a previous input layer or hidden layer. In particular, each neuron is associated with a filter of a particular window size. A neuron of the convolutional layer is connected with neurons of a previous layer that are within the filter. The filters of a set of neurons of a convolutional layer span across the neurons of the previous layer. As an example, a previous layer may include five neurons: Neuron 1, Neuron 2, Neuron 3, Neuron 4, Neuron 5. A convolutional layer may include neurons associated with a filter of size three. Hence a first neuron of the convolutional layer may be connected to Neuron 1, Neuron 2, Neuron 3; a second neuron of the convolutional layer may be connected to Neuron 2, Neuron 3, Neuron 4; a third neuron of the convolutional layer may be connected to Neuron 3, Neuron 4, Neuron 5. The first, second, and third neurons of the convolutional layer thereby span across the neurons of the previous layer. The first, second, and third neurons together produce a vector. The vector includes three elements: one element determined based on Neuron 1, Neuron 2, Neuron 3; another element determined based on Neuron 2, Neuron 3, Neuron 4; another element determined based on Neuron 3, Neuron 4, Neuron 5.

A max pooling layer includes a set of neurons associated with weights that are not learned via machine learning but are determined based on the values of the inputs. In particular, the input with the maximum value has a weight of one, while all other inputs have a weight of zero.

Additional and/or alternative types of machine learning algorithms may also be used.

In an embodiment, the inferred user attribute model includes a single data model to determine one or more inferred user attributes. In another embodiment, the inferred user attribute model includes different data models to determine different inferred user attributes. The different data models may use the same type of machine learning algorithm or different types of machine learning algorithms. In another embodiment, the inferred user attribute model includes different candidate data models that accepts different types of input variables to determine different inferred user attributes. The inferred user attribute model may select a subset of the candidate data models for determining inferred user attributes, for a particular user, depending on the available input variables derived from the user information collected for the particular user. Additionally or alternatively, the inferred user attribute model may select a subset of the candidate data models for determining inferred user attributes, depending on the inferred user attributes needed.

In an embodiment, the machine learning system checks which inferred user attributes are required as input for determining whether to add the user to the inclusion group and/or exclusion group, as described above with reference to FIGS. 6A-B. In particular, the target group selection system checks which attributes are to be evaluated using inclusion ranges and/or inclusion weights at Operations 604 and 610. The target group selection system checks which attributes are to be evaluated using exclusion ranges and/or exclusion weights at Operations 624 and 630. The target group selection system then generates one or more inferred user attribute models for determining the required inferred user attributes. The target group selection system may but does not necessarily generate any data models for determining other inferred user attributes.

In an embodiment, after generating an inferred user attribute model, the machine learning system stores the inferred user attribute model in a data repository. The machine learning system may subsequently obtain an updated training set (including new historical user information and/or new labeled inferred user attributes). The machine learning system may generate an updated inferred user attribute model by applying a machine learning algorithm to the updated training set. Next time that the inferred user attribute model is needed, the target group selection engine may retrieve the inferred user attribute model from the data repository, rather than requesting the machine learning system to generate an inferred user attribute model.

One or more embodiments include determining inferred user attributes by applying the inferred user attribute model to the user information (Operation 708). The target group selection engine applies the inferred user attribute model to the user information obtained at Operation 702 to determine inferred user attributes.

Optionally, the target group selection engine manipulates the user information in a pre-processing phase. For example, the target group selection engine may convert the user information into a standardized format. Additionally or alternatively, the target group selection engine may encode the user information.

In an embodiment, the inferred user attribute model uses a regression function. The target group selection engine inputs the user information obtained at Operation 702 into the regression function. The regression function outputs one or more inferred user attributes.

In an embodiment, the inferred user attribute model uses a knn data model. The knn data model includes sets of historical user information, associated with respective labeled inferred user attributes.

The target group selection engine determines a count k of a subset of the historical user information, associated with different users, to be selected for determining one or more inferred user attributes. The target group selection engine also determines a difference measurement function. The difference measurement function is configured to determine a difference between (a) the k selected sets of historical user information, and (b) the user information obtained at Operation 702. An example of a difference measurement function is a function that determines a Euclidean distance between two points.

Thereafter the target group selection engine selects k sets of historical user information in the knn data model such that the difference, determined by the difference measure function, is minimized.

The target group selection engine determines the inferred user attributes based on the k selected sets of historical user information, without using the remaining historical user information in the knn data model. The target group selection engine may determine an inferred user attribute by determining an average (such as, mean, median, or mode) of the labeled inferred user attributes associated with the k selected sets of historical user information.

As an example, a target group selection engine may determine that a count k of sets of historical user information to be selected is five. The target group selection engine may select five sets of historical user information in a knn data model that are nearest to a set of user information of a particular user. Two of the five sets of historical user information may be labeled with an inferred user attribute, "parent." Three of the five sets of historical user information may be labeled with an inferred user attribute, "not a parent." The target group selection engine may determine an average associated with the labeled inferred user attributes. In the above example, the target group selection engine may determine that an inferred user attribute score for the particular user for being a parent is 2/5=0.40.

In an embodiment, the inferred user attribute model uses a decision tree. The target group selection engine identifies a variable associated with a first split of the decision tree. The target group selection engine determines a value for the variable from the user information obtained at Operation 702. The target group selection engine inputs the value as the variable associated with the first split to determine which branch of the decision tree to follow. The target group selection engine then moves to a next split of the decision tree. The target group selection engine iterates the above process until a leaf of the decision tree is reached. The leaf determines one or more inferred user attributes for the particular user.

In an embodiment, the inferred user attribute model uses an ANN. The target group selection engine inputs the user information obtained at Operation 702 into the ANN. The ANN outputs one or more inferred user attributes.

Additional and/or alternative functions and/or models may also be used in the inferred user attribute model.

In an embodiment, the target group selection system checks which inferred user attributes are required as input for determining whether to add the user to the inclusion group and/or exclusion group, as described above with reference to FIGS. 6A-B. In particular, the target group selection system checks which attributes are to be evaluated using inclusion ranges and/or inclusion weights at Operations 604 and 610. The target group selection system checks which attributes are to be evaluated using exclusion ranges and/or exclusion weights at Operations 624 and 630. The target group selection system then applies one or more inferred user attribute models to the user information obtained at Operation 702 to determine the required inferred user attributes. The target group selection system may but does not necessarily determine any other inferred user attributes from the user information.

One or more embodiments include generating an affinity attribute model via machine learning (Operation 710). The machine learning system generates an affinity attribute model via machine learning.

The machine learning system obtains a training set for training the affinity attribute model. The training set includes user information and corresponding labeled affinity attributes. The training set also optionally includes scores associated with the labeled affinity attributes. The scores indicate a degree to which a particular set of user information exhibits the labeled affinity attribute. Examples of operations for obtaining a training set are described above with reference to Operation 706.

As an example, a machine learning system may obtain the following training set:

TABLE 5

| User Information | Labeled Affinity Attribute |
|---|---|
| Name: Mary<br>Birthday: Dec. 6, 1982<br>Occupation: Attorney<br>Web Interaction History: Visited sportsnews.com on Oct. 1, 2019; visited | Positive Affinity Towards:<br>Professional clothing, score 82<br>Sports clothing, score 76<br>Technical gear, score 60 |

TABLE 5-continued

| User Information | Labeled Affinity Attribute |
|---|---|
| investment.com on Oct. 2, 2019; visited basketballteam.com on Oct. 2, 2019<br>Name: John<br>Geographical Location: Los Angeles, CA<br>Education: Graduated UCLA in 2007<br>Web Interaction History: Visited uclafootballteam.com on Oct. 3, 2019; visited restaurantabc.com on Oct. 3, 2019 | Negative Affinity Towards:<br>Jeans, score 70<br>Positive Affinity Towards:<br>Cookbooks, score 65<br>Negative Affinity Towards:<br>Romance books, score 76 |

The machine learning system applies a machine learning algorithm to the training set to generate an affinity attribute model. Various machine learning algorithms may be used. Examples of operations for applying a machine learning algorithm to a training set to generate one or more data models are described above with reference to Operation 706.

One or more embodiments include determining affinity attributes by applying the affinity attribute model to the user information (Operation 712). The target group selection engine applies the affinity attribute model to the user information obtained at Operation 702 to determine affinity attributes. Examples of operations for applying one or more data models to user information to determine attributes for the particular user are described above with reference to Operation 708.

One or more embodiments include generating a user profile for the particular user (Operation 714). The target group selection engine generates a user profile for the particular user. The user profile includes (a) the confirmation user attributes determined at Operation 704; (b) the inferred user attributes determines at Operation 708; and/or (c) the affinity attributes determined at Operation 712.

In an embodiment, the target group selection engine may iterate the operations of FIG. 7 with respect to each set of user information associated with a different user. The target group selection engine may therefore generate and/or enhance user profiles for multiple users.

6. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 8A:
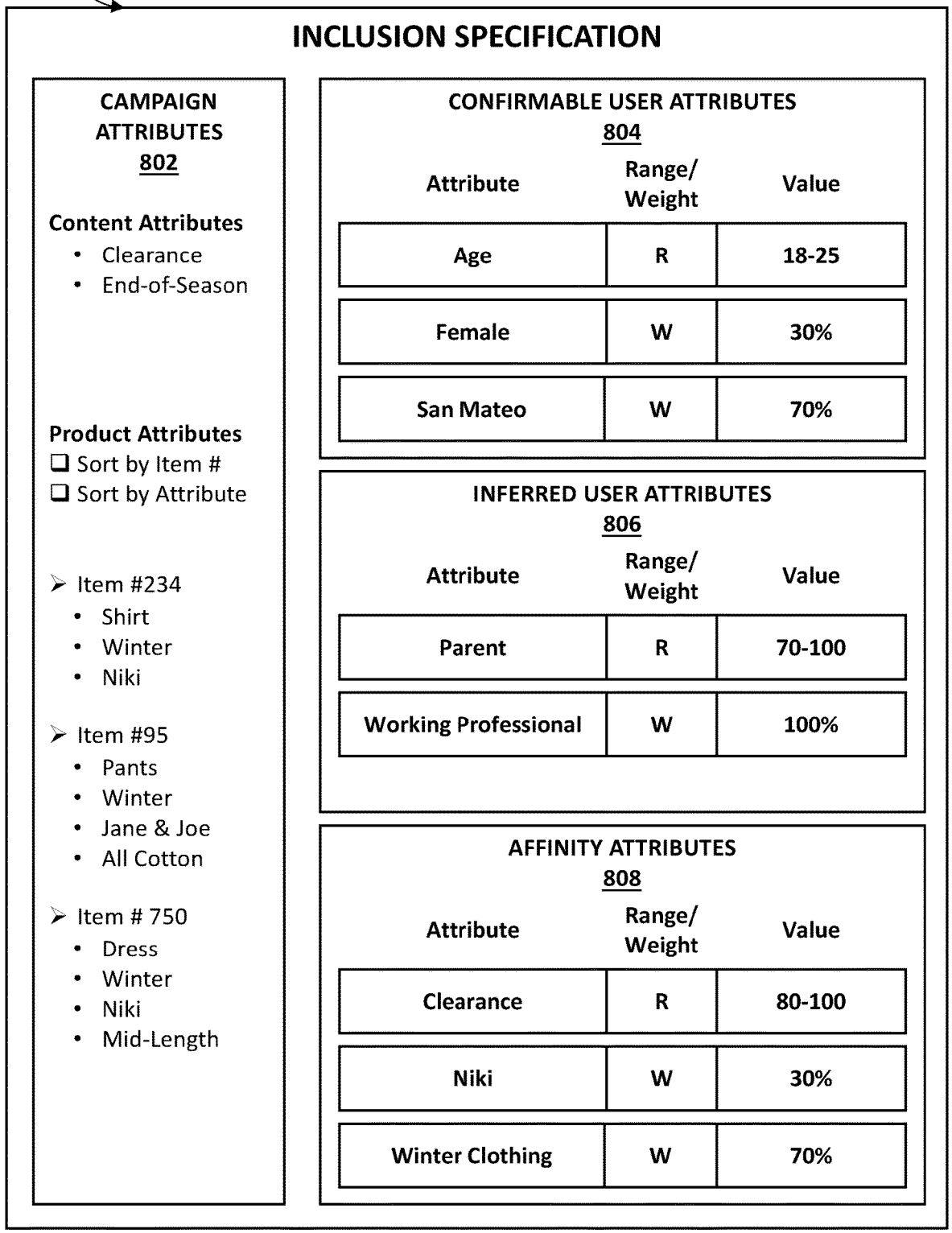
FIGS. 8A-B illustrate an example user interface for specifying target user tuning parameters, in accordance with one or more embodiments.
Figure 8B:
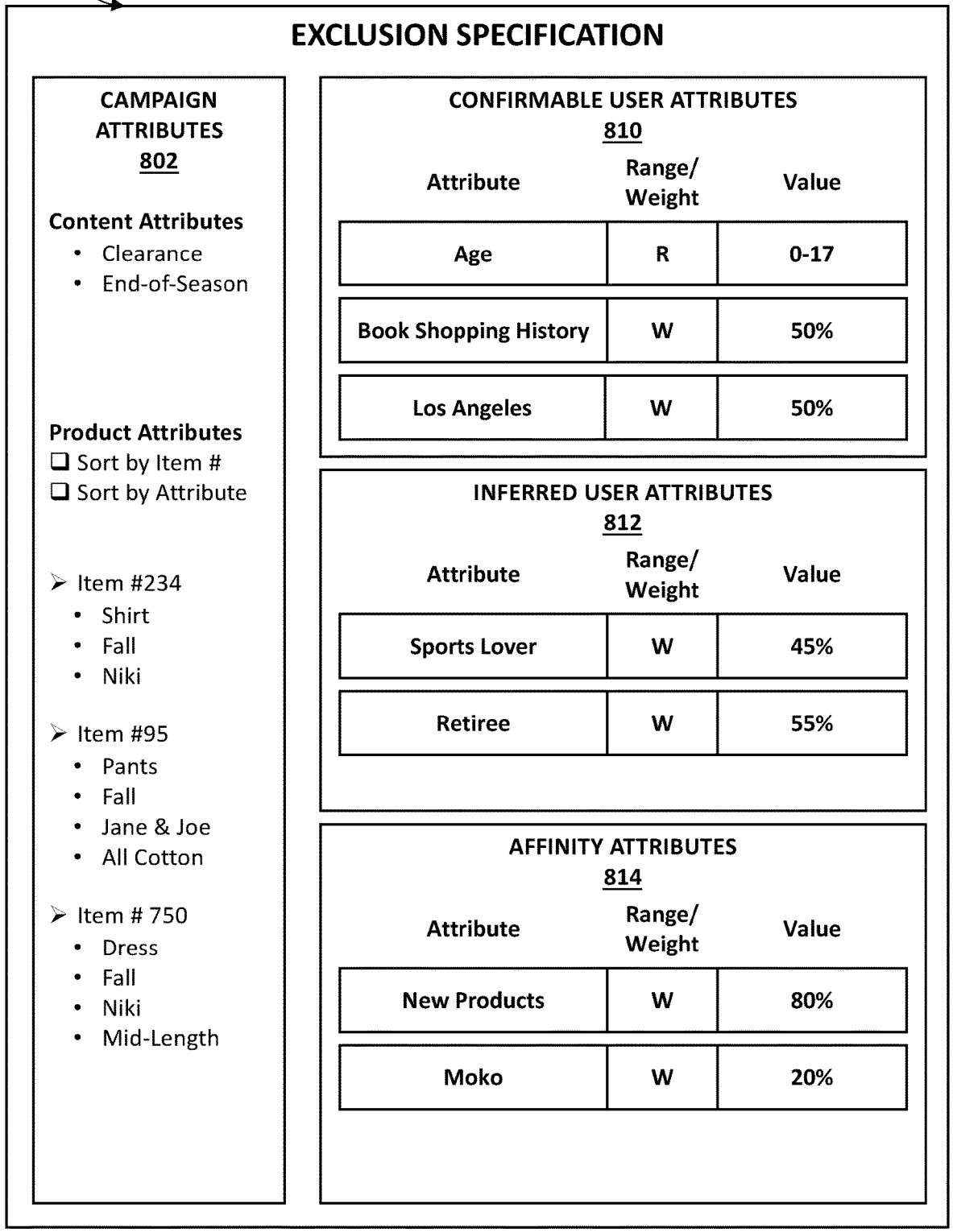

FIGS. 8A-B illustrate an example user interface for specifying target user tuning parameters, in accordance with one or more embodiments.

As illustrated, user interface 800 is configured to accept specification of inclusion tuning parameters. User interface 800 includes various regions for presenting different types of information. One region presents campaign attributes 802. Other regions present confirmable user attributes 804, inferred user attributes 806, and affinity attributes 808 relevant to determining inclusion of a user into a target group.

Campaign attributes 802 includes content attributes and product attributes. Content attributes are determined based on content items specified in a campaign profile of a campaign. Product attributes are determined based on products specified in the campaign profile.

As illustrated, content attributes include "Clearance" and "End-of-Season." The content attributes indicate that the campaign is a clearance and end-of-season sale. Content items may include, for example, "End of Season Sale!

Winter is ending and spring is here. Last chance to snatch these deals," or "Clearance Sale! Going, going, gone. Get these winter boots before it's too late."

As illustrated, different types of product attributes may be available for different products. Products associated with the campaign include Item #234. Product attributes include the product type "shirt," the applicable season for the clothing "winter," the product brand "Niki." Additionally, products associated with the campaign include Item #95. Product attributes include the product type "pants," the applicable season for the clothing "winter," the product brand "Jane & Joe," and the material "all cotton." Additionally, products associated with the campaign include Item #750. Product attributes include the product type "dress," the applicable season for the clothing "winter," the product brand "Niki," and the dimensions "mid-length."

An administrator enters, via user interface 800, user attributes relevant for determining the inclusion group under confirmable user attributes 804, inferred user attributes 806, and/or affinity attributes 808. As illustrated, the administrator has entered "Age," "Female," and "San Mateo" under confirmable user attributes 804. The administrator has entered "Parent," and "Working Professional" under inferred user attributes 806. The administrator has entered "Clearance," "Niki," and "Winter Clothing" under affinity attributes 808.

The administrator may use a variety of input methods for entering the relevant user attributes. The administrator may type in the user attributes. Additionally or alternatively, the administrator may select the user attributes from a dropdown menu. Additionally or alternatively, the administrator may drag-and-drop content attributes and/or product attributes from campaign attributes 802 into affinity attributes 808.

Additionally, the administrator enters, via user interface 800, (a) whether each relevant user attribute is to be evaluated using an inclusion range or an inclusion weight, and (b) a corresponding value. If an inclusion range is indicated, the corresponding value indicates a required range of values for the user attribute for including the user into the inclusion group. If an inclusion weight is indicated, the corresponding value indicates a weight to be applied to a value for the user attribute for determining inclusion of the user into the inclusion group.

As an example, the administrator has specified that the "Age" attribute is to be evaluated using an inclusion range. The administrator has specified that the corresponding value is "18-25." The above inclusion specification indicates that an inclusion range for "Age" is [18-25]. If a user is between 18 and 25 years old, the user is included in the inclusion group. Otherwise, the user is excluded from the inclusion group.

As another example, the administrator has specified that the "Female" attribute is to be evaluated using an inclusion weight. The administrator has specified that the corresponding value is "30%." The above inclusion specification indicates that an inclusion weight of 30% is to be applied to the confirmable user attribute "Female." Various inclusion weights are applied to various user attributes to determine a weighted sum, which becomes an inclusion score. If the inclusion score is above a threshold value, the user is included in the inclusion group. Otherwise, the user is excluded from the inclusion group.

After submission of the inclusion specification, user interface 800 is configured to accept specification of exclusion tuning parameters. User interface 800 includes various regions for presenting different types of information. One region presents campaign attributes 802. Other regions present confirmable user attributes 810, inferred user attributes 812, and affinity attributes 814 relevant to determining exclusion of a user from a target group.

An administrator enters, via user interface 800, user attributes relevant for determining the exclusion group under confirmable user attributes 810, inferred user attributes 812, and/or affinity attributes 814. As illustrated, the administrator has entered "Age," "Book Shopping History," and "Los Angeles" under confirmable user attributes 810. The administrator has entered "Sports Lover," and "Retiree" under inferred user attributes 812. The administrator has entered "New Products," and "Moko" (a product brand) under affinity attributes 814. As described above, the administrator may use a variety of input methods for entering the relevant user attributes.

Additionally, the administrator enters, via user interface 800, (a) whether each relevant user attribute is to be evaluated using an exclusion range or an exclusion weight, and (b) a corresponding value. If an exclusion range is indicated, the corresponding value indicates a required range of values for the user attribute for including the user into the exclusion group. If an exclusion weight is indicated, the corresponding value indicates a weight to be applied to a value for the user attribute for determining inclusion of the user into the exclusion group.

Based on the relevant user attributes, inclusion ranges, inclusion weights, exclusion ranges, and exclusion weights entered via the user interface 800, a target group selection engine determines an inclusion group of users and an exclusion group of users. Users who are in the inclusion group but not the exclusion group are included in a target group for receiving content items associated with the campaign. Other users do not receive content items associated with the campaign.

Figure 9A:
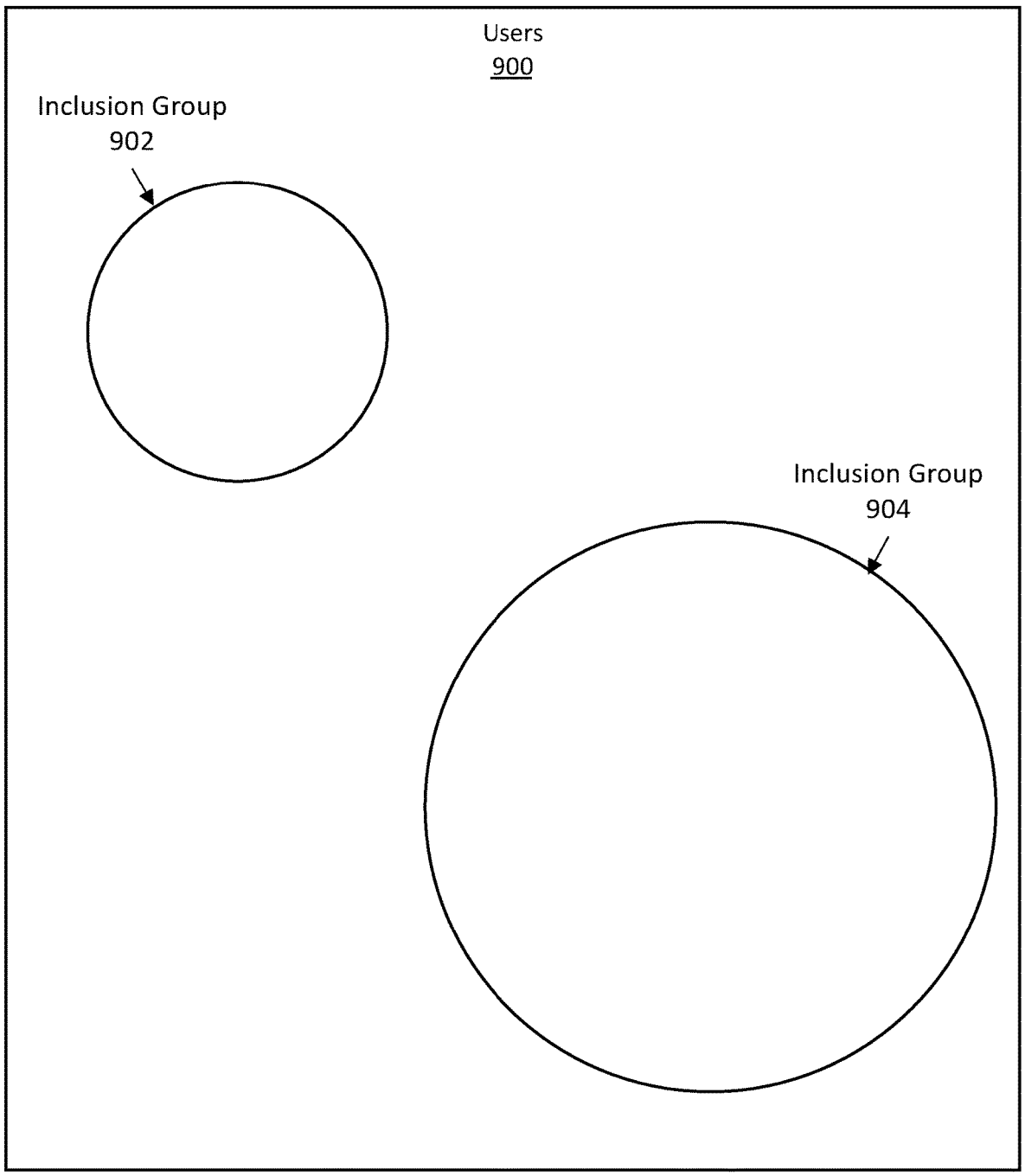
FIGS. 9A-C shows example Venn diagrams illustrating inclusion groups, exclusion groups, and target groups, in accordance with one or more embodiments.
Figure 9B:
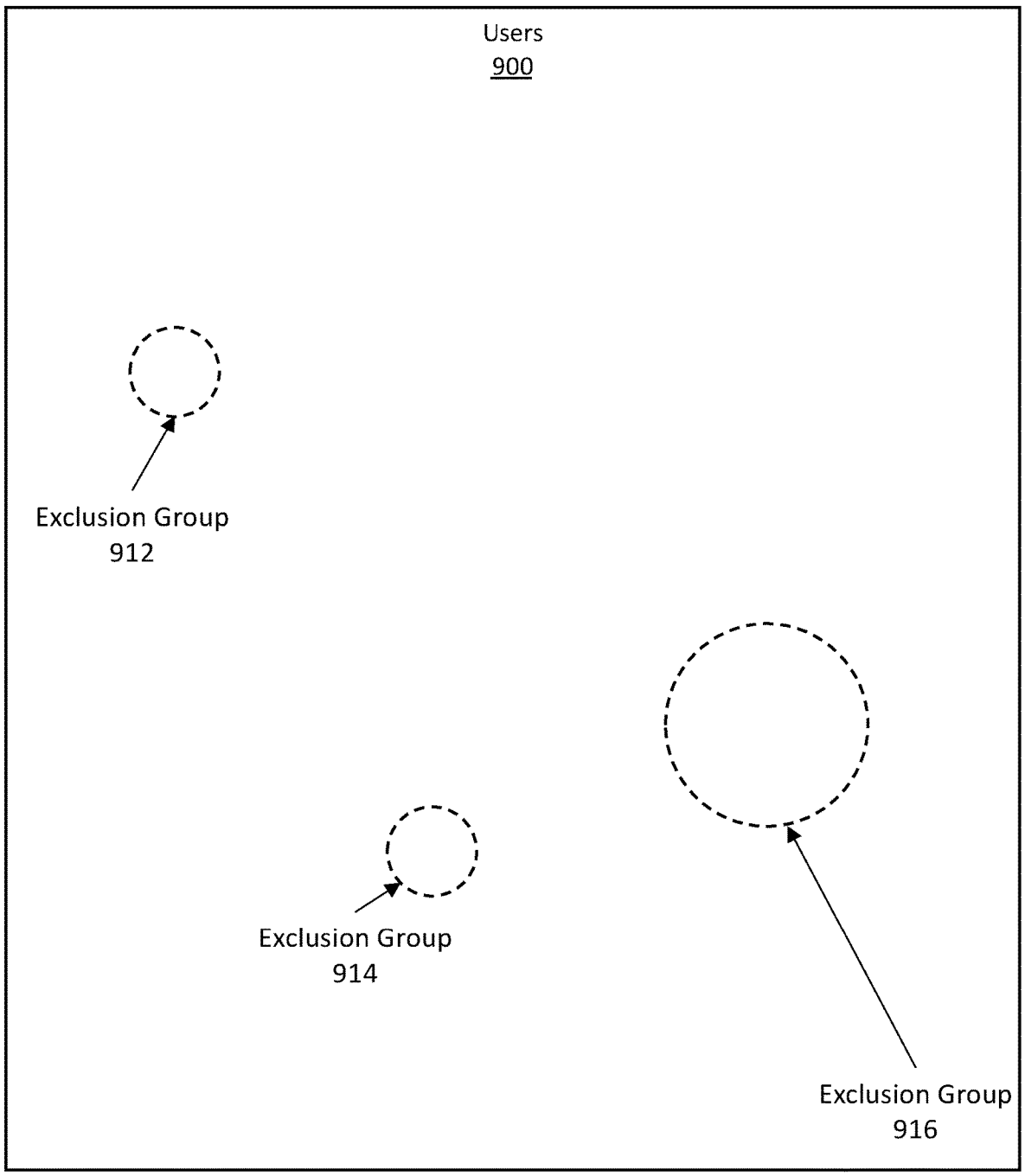
Figure 9C:
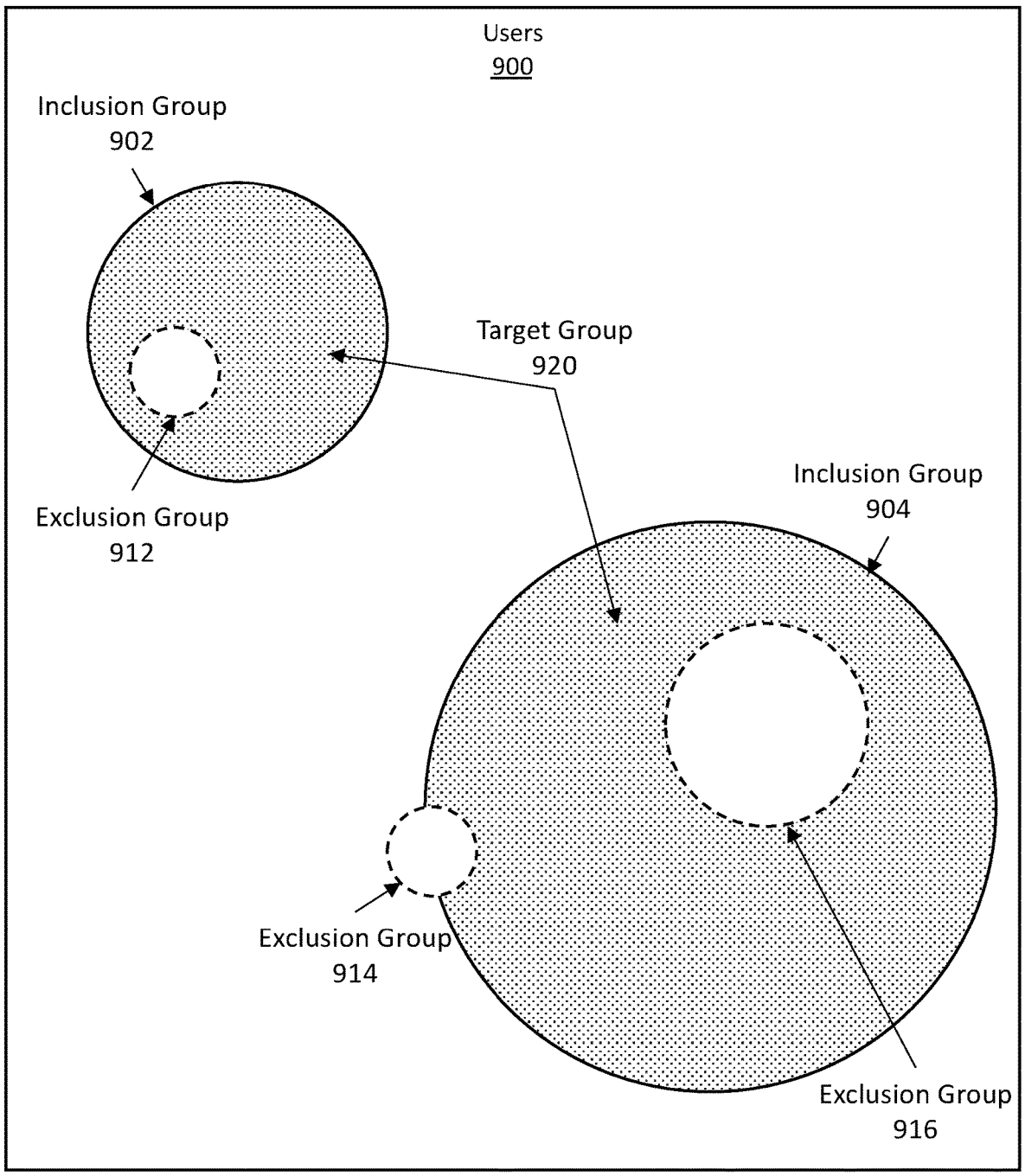

FIGS. 9A-C shows example Venn diagrams illustrating inclusion groups, exclusion groups, and target groups, in accordance with one or more embodiments.

A target group selection engine has functionality to cause transmission of content items to a set of users 900.

Referring to FIG. 9A, the target group selection engine applies inclusion ranges and/or inclusion weights to user attributes of users 900 to determine respective inclusion scores. The target group selection engine compares each inclusion score with a threshold value. If an inclusion score for a particular user is above the threshold value, the particular user is included in the inclusion group. Otherwise, the particular user is not included in the inclusion group. The circles, inclusion group 902 and inclusion group 904, represent a subset of users 900 for which the inclusion scores are above the threshold value.

Referring to FIG. 9B, the target group selection engine applies exclusion ranges and/or exclusion weights to user attributes of users 900 to determine respective exclusion scores. The target group selection engine compares each exclusion score with a threshold value. If an exclusion score for a particular user is above the threshold value, the particular user is included in the exclusion group. Otherwise, the particular user is not included in the exclusion group. The circles, exclusion group 912, exclusion group 914, and exclusion group 916, represent a subset of users 900 for which the exclusion scores are above the threshold value.

Optionally, rather than evaluating all users 900, the target group selection engine may evaluate only users of inclusion group 902 and inclusion group 904 to determine exclusion scores of only users of inclusion group 902 and inclusion group 904. Selective evaluation for determining the exclusion group may increase efficiency for determining the target group.

Referring to FIG. 9C, the exclusion groups 912-916 are superimposed on the inclusion groups 902-904 in a Venn diagram. Target group 920 is represented by the dotted-pattern regions. Users who are in any of inclusion groups 902-904, without being in any of exclusion groups 912-916 are within target group 920.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

training at least one affinity attribute model using machine learning to determine values for at least a first plurality of affinity attributes and a second plurality of affinity attributes, each of the first plurality of affinity attributes representing a respective affinity towards each of a first plurality of product attributes, each of the second plurality of affinity attributes representing a respective negative affinity toward each of a second plurality of product attributes, and the training comprising:
obtaining training data sets comprising historical information associated with a plurality of users;
training the at least one affinity attribute model based on the training data sets;
determining that a set of two or more products associated with a campaign is associated with the first plurality of product attributes;
wherein a first product of the set of two or more products is associated with a first attribute and a second attribute of the first plurality of product attributes;
wherein a second product of the set of two or more products is associated with the second attribute and a third attribute of the first plurality of product attributes different from the first attribute;
applying the at least one affinity attribute model to a first set of user information for a first user to determine a first plurality of values for the first plurality of affinity attributes and a second plurality of values for the second plurality of affinity attributes, wherein each respective value for the first plurality of affinity attributes represents a respective level for which the first user favors a respective product attribute of the first plurality of product attributes, wherein each respective value for the second plurality of affinity attributes represents a respective level for which the user disfavors a respective product attribute of the second plurality of product attributes;
determining a first plurality of weights applicable to the first plurality of affinity attributes and a second plurality of weights applicable to the second plurality of affinity attributes;
determining an inclusion score for the first user, wherein determining the inclusion score comprises:
applying the first plurality of weights to the first plurality of values for the first plurality of affinity attributes to determine a first plurality of weighted values;
determining a first weighted sum based at least on adding the first plurality of weighted values;
determining the inclusion score based on the first weighted sum;
determining an exclusion score for the first user, wherein determining the exclusion score comprises:
applying the second plurality of weights to the second plurality of values for the second plurality of affinity attributes;
determining a second weighted sum based at least on adding the second plurality of weighted values;
determining the exclusion score based on the second weighted sum;
determining whether the inclusion score satisfies a first threshold value and whether the exclusion score satisfies a second threshold value;
including the first user in a target group for receiving a set of content items, associated with the campaign, responsive at least to: determining that the inclusion score satisfies the first threshold value and the exclusion score does not satisfy the second threshold value.

2. The one or more non-transitory machine-readable media of claim 1, further storing instructions which cause:

generating an inferred user attribute model using machine learning, wherein the inferred user attribute model is configured to determine a value for an inferred user attribute;

applying the inferred user attribute model to a second set of user information for the first user to determine a particular value for the inferred user attribute for the first user;

determining a weight applicable to the inferred user attribute;

wherein determining the inclusion score for the first user further comprises:

applying the weight to the particular value for the inferred user attribute.

3. The one or more non-transitory machine-readable media of claim 1, further storing instructions which cause:

determining a particular value for a confirmable user attribute for the first user;

determining a weight applicable to the confirmable user attribute;

wherein determining the inclusion score for the first user further comprises:

applying the weight to the particular value for the confirmable user attribute.

4. The one or more non-transitory machine-readable media of claim 1, further storing instructions which cause:

generating an inferred user attribute model using machine learning, wherein the inferred user attribute model is configured to determine a value for an inferred user attribute;

applying the inferred user attribute model to a second set of user information for the first user to determine a particular value for the inferred user attribute for the first user;

determining a weight applicable to the inferred user attribute;

wherein determining the exclusion score further comprises:

applying the weight to the inferred user attribute.

5. The one or more non-transitory machine-readable media of claim 1, further storing instructions which cause:

determining a particular value for a confirmable user attribute for the first user;

determining an exclusion range applicable to the confirmable user attribute;

wherein including the first user in the target group for receiving the set of content items is further responsive to: determining that the particular value is not within the exclusion range for the confirmable user attribute.

6. The one or more non-transitory machine-readable media of claim 1, further storing instructions which cause:

generating the target group, wherein generating the target group comprises:

determining a respective inclusion score for each of a plurality of users;

determining a respective exclusion score for each of a plurality of users;

determining that, for a first subset of the plurality of users, (a) the respective inclusion scores are greater than the first threshold value and (b) the respective exclusion scores are less than the second threshold value;

determining that, for a second subset of the plurality of users, (a) the respective inclusion scores are less than the first threshold value or (b) the respective exclusion scores are greater than the second threshold value;

including the first subset of the plurality of users into the target group and excluding the second subset of the plurality of users from the target group.

7. The one or more non-transitory machine-readable media of claim 1, further storing instructions which cause:

transmitting the set of content items, associated with the campaign, to each user included in the target group.

8. The one or more non-transitory machine-readable media of claim 1, further storing instructions which cause:

obtaining a campaign profile specifying the set of products;

obtaining respective product profiles specifying respective sets of product attributes of the set of products;

determining the first plurality of product attributes, wherein the first plurality of product attributes comprises the respective sets of product attributes of the set of products.

9. One or more non-transitory machine-readable media storing instructions which, when executed by one or more processors, cause:

training at least one affinity attribute model using machine learning to determine values for at least a first plurality of affinity attributes and a second plurality of affinity attributes, each of the first plurality of affinity attributes representing a respective affinity towards each of a first plurality of product attributes, each of the second plurality of affinity attributes representing a respective negative affinity toward each of a second plurality of product attributes, and the training comprising:

obtaining training data sets comprising historical information associated with a plurality of users;

training the at least one affinity attribute model based on the training data sets;

determining that a set of two or more products associated with a campaign is associated with the first plurality of product attributes;

wherein a first product of the set of two or more products is associated with a first attribute of the first plurality of product attributes;

wherein a second product of the set of two or more products is associated with a second attribute of the first plurality of product attributes different from the first attribute;

applying the at least one affinity attribute model to a first set of user information for a first user to determine a first plurality of values for the first plurality of affinity attributes and a second plurality of values for the second plurality of affinity attributes, wherein each respective value for the first plurality of affinity attributes represents a respective level for which the first user favors a respective product attribute of the first plurality of product attributes, wherein each respective value for the second plurality of affinity attributes represents a respective level for which the user disfavors a respective product attribute of the second plurality of product attributes;

determining a plurality of inclusion ranges applicable to the first plurality of affinity attributes and a plurality of exclusion ranges applicable to the second plurality of affinity attributes;

including the first user in a target group for receiving a set of content items, associated with the campaign, responsive at least to: determining that the first plurality of values are respectively within the plurality of inclusion ranges for the first plurality of affinity attributes and not within the plurality of exclusion ranges applicable to the second plurality of affinity attributes.

10. The one or more non-transitory machine-readable media of claim 9, further storing instructions which cause:
  generating an inferred user attribute model using machine learning, wherein the inferred user attribute model is configured to determine a value for an inferred user attribute;
  applying the inferred user attribute model to a second set of user information for the first user to determine a particular value for the inferred user attribute for the first user;
  determining an inclusion range applicable to the inferred user attribute;
  wherein including the first user in the target group for receiving the set of content items is further responsive to: determining that the particular value is within the inclusion range for the inferred user attribute.

11. The one or more non-transitory machine-readable media of claim 9, further storing instructions which cause:
  generating an inferred user attribute model using machine learning, wherein the inferred user attribute model is configured to determine a value for an inferred user attribute;
  applying the inferred user attribute model to a second set of user information for the first user to determine a particular value for the inferred user attribute for the first user;
  determining an exclusion range applicable to the inferred user attribute;
  wherein including the first user in the target group for receiving the set of content items is further responsive to: determining that the particular value is not within the exclusion range for the inferred user attribute.

12. The one or more non-transitory machine-readable media of claim 9, further storing instructions which cause:
  determining a particular value for a confirmable user attribute for the first user;
  determining an exclusion range applicable to the confirmable user attribute;
  wherein including the first user in the target group for receiving the set of content items is further responsive to: determining that the particular value is not within the exclusion range for the confirmable user attribute.

13. The one or more non-transitory machine-readable media of claim 9, further storing instructions which cause:
  generating the target group, wherein generating the target group comprises:
    determining respective values for a first affinity attribute for a plurality of users;
    determining respective values for a second affinity attribute for the plurality of users;
    determining that, for a first subset of the plurality of users, (a) the respective values for the first affinity attribute are within an inclusion range and (b) the respective values for the second affinity attribute are not within an exclusion range;
    determining that, for a second subset of the plurality of users, (a) the respective values for the first affinity attribute are not within the inclusion range or (b) the respective values for the second affinity attribute are within the exclusion range;
    including the first subset of the plurality of users into the target group and excluding the second subset of the plurality of users from the target group.

14. The one or more non-transitory machine-readable media of claim 9, further storing instructions which cause:
  transmitting the set of content items, associated with the campaign, to each user included in the target group.

15. The one or more non-transitory machine-readable media of claim 9, further storing instructions which cause:
  obtaining a campaign profile specifying the set of products;
  obtaining respective product profiles specifying respective sets of product attributes of the set of products;
  determining the first plurality of product attributes, wherein the first plurality of product attributes comprises the respective sets of product attributes of the set of products.

16. A system comprising:
  one or more devices including one or more hardware processors; and
  the system being configured to perform operations comprising:
    training at least one affinity attribute model using machine learning to determine values for at least a first plurality of affinity attributes and a second plurality of affinity attributes, each of the first plurality of affinity attributes representing a respective affinity towards each of a first plurality of product attributes, each of the second plurality of affinity attributes representing a respective negative affinity toward each of a second plurality of product attributes, and the training comprising:
      obtaining training data sets comprising historical information associated with a plurality of users;
      training the at least one affinity attribute model based on the training data sets;
    determining that a set of two or more products associated with a campaign is associated with the first plurality of product attributes;
      wherein a first product of the set of two or more products is associated with a first attribute and a second attribute of the first plurality of product attributes;
      wherein a second product of the set of two or more products is associated with the second attribute and a third attribute of the first plurality of product attributes different from the first attribute;
    applying the at least one affinity attribute model to a first set of user information for a first user to determine a first plurality of values for the first plurality of affinity attributes and a second plurality of values for the second plurality of affinity attributes, wherein each respective value for the first plurality of affinity attributes represents a respective level for which the first user favors a respective product attribute of the first plurality of product attributes, wherein each respective value for the second plurality of affinity attributes represents a respective level for which the user disfavors a respective product attribute of the second plurality of product attributes;
    determining a first plurality of weights applicable to the first plurality of affinity attributes and a second plurality of weights applicable to the second plurality of affinity attributes;
    determining an inclusion score for the first user, wherein determining the inclusion score comprises:
      applying the first plurality of weights to the first plurality of values for the first plurality of affinity attributes to determine a first plurality of weighted values;
      determining a first weighted sum based at least on adding the first plurality of weighted values;
      determining the inclusion score based on the first weighted sum;

determining an exclusion score for the first user, wherein determining the exclusion score comprises:
  applying the second plurality of weights to the second plurality of values for the second plurality of affinity attributes;
  determining a second weighted sum based at least on adding the second plurality of weighted values;
  determining the exclusion score based on the second weighted sum;
determining whether the inclusion score satisfies a first threshold value and whether the exclusion score satisfies a second threshold value;
including the first user in a target group for receiving a set of content items, associated with the campaign, responsive at least to: determining that the inclusion score satisfies the first threshold value and the exclusion score does not satisfy the second threshold value.

17. The one or more non-transitory machine-readable media of claim 1, further storing instructions which cause:
  receiving user input specifying target tuning parameters for tuning the inclusion score; and
  generating an inclusion score function based at least in part on the target tuning parameters;
  wherein the first weighted sum is computed using the inclusion score function.

18. The one or more non-transitory machine-readable media of claim 1, further storing instructions which cause:
  receiving user input specifying target tuning parameters for tuning the exclusion score; and
  generating an exclusion score function based at least in part on the target tuning parameters;
  wherein the second weighted sum is computed using the exclusion score function.

19. The one or more non-transitory machine-readable media of claim 1, further storing instructions which cause:
  receiving user input specifying target tuning parameters for tuning an inclusion score; and
  generating an inclusion score function based at least in part on the target tuning parameters;
    wherein the plurality of inclusion ranges are determined based at least in part on the inclusion score function.

20. The one or more non-transitory machine-readable media of claim 1, further storing instructions which cause:
  receiving user input specifying target tuning parameters for tuning an exclusion score; and
  generating an exclusion score function based at least in part on the target tuning parameters;
    wherein the plurality of exclusion ranges are determined based at least in part on the exclusion score function.

* * * * *